United States Patent [19]

Greene

[11] 4,454,465
[45] Jun. 12, 1984

[54] ELECTRIC GENERATOR THAT OPERATES WITH FEW AMPERE-TURNS IN FIELD WINDING

[75] Inventor: William J. Greene, Walterboro, S.C.
[73] Assignee: Teledyne Walterboro, a Division of Teledyne Industries, Inc., Calif.
[21] Appl. No.: 258,584
[22] Filed: Apr. 29, 1981
[51] Int. Cl.³ .................. H02P 9/10; H02P 9/40; H02K 3/00; H02K 19/26
[52] U.S. Cl. .................. 322/49; 310/68 D; 310/184; 322/89
[58] Field of Search .................. 310/68 D, 184; 322/49-52, 89, 90, 95

[56] References Cited

U.S. PATENT DOCUMENTS

| | | | |
|---|---|---|---|
| 3,676,764 | 7/1972 | Syverson | 322/51 |
| 3,713,015 | 1/1973 | Frister | 322/51 X |
| 4,004,211 | 1/1977 | Takao et al. | 310/184 X |
| 4,138,619 | 2/1979 | Broadway et al. | 310/184 |

FOREIGN PATENT DOCUMENTS 0133878  1/1979  German Democratic Rep. . 310/68D

*Primary Examiner*—R. J. Hickey
*Attorney, Agent, or Firm*—Rogers, Eilers & Howell

[57] ABSTRACT

The electric generator of the present invention has a plural-section main winding; and it uses uni-directional devices to permit current to flow through various sections of that winding as the rotor poles move away from various of the stator poles of that generator but to prevent current flow through those various sections as those rotor poles approach those stator poles. By preventing current flow through those various sections, as those rotor poles approach those stator poles, the present invention relieves the field winding of all need of overcoming the magnetomotive force of that main winding. As a result, fewer ampere turns are needed to enable that field winding to provide the magnetomotive force for that main winding.

In some preferred embodiments of the present invention, an exciting winding has sections thereof that are wound on poles which have turns of the field winding wound thereon. That exciting winding responds to the magnetic lines of flux from the field winding to provide a power amplification that further reduces the number of ampere turns required for that field winding. The sections of that exciting winding are connected to the sections of the main winding to develop a D.C. exciting current in that main winding; and that exciting current enables that generator to provide a desirably-high output.

49 Claims, 11 Drawing Figures

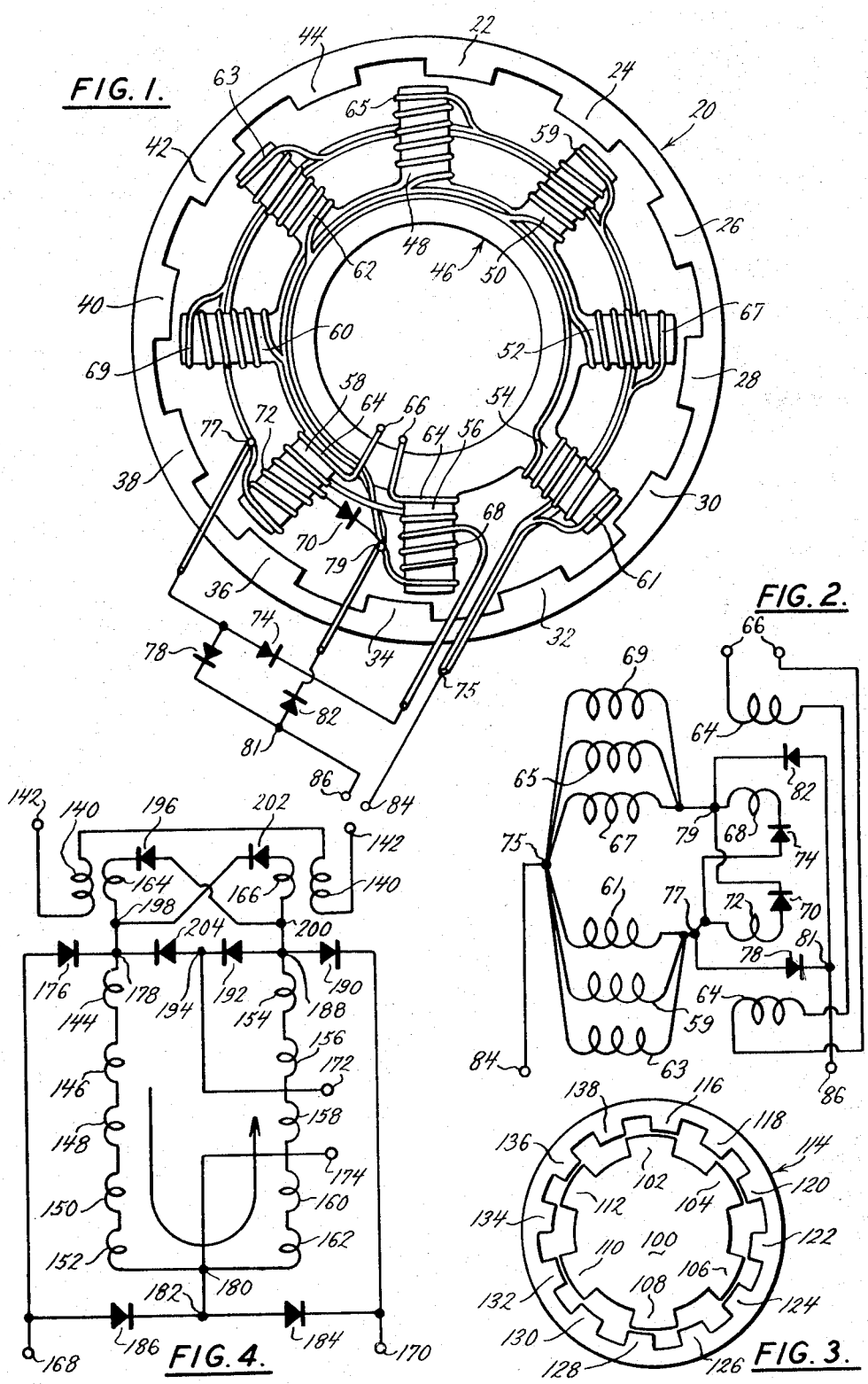

ELECTRIC GENERATOR THAT OPERATES WITH FEW AMPERE-TURNS IN FIELD WINDING

BACKGROUND OF THE INVENTION

It is desirable to reduce the amount of electrical energy which must be supplied to the field winding of an electric generator. Such a reduction permits smaller, and hence less expensive, equipment to be used to supply such energy.

SUMMARY OF THE INVENTION

The present invention provides a plural-section main winding for an electrical generator; and it uses uni-directional devices to permit current to flow through various sections of that winding as the rotor poles move away from various of the stator poles of that generator while preventing current flow through those various sections as those rotor poles approach those stator poles. In doing so, the present invention relieves the field winding of all need of overcoming the magneto-motive force of that main winding; and hence enables fewer-than-normal ampere turns in that field winding to provide the magnetomotive force for that main winding. It is, therefore, an object of the present invention to provide an electric generator with a plural-section main winding and to provide uni-directional devices which permit current flow through the sections of that winding only when the rotor poles move away from the stator poles.

In some preferred embodiments of generator provided by the present invention, an exciting winding has sections thereof wound on poles which have turns of the field winding wound thereon. That exciting winding responds to the magnetic lines of flux from the field winding to provide a power amplification that further reduces the number of ampere turns required for that field winding. The sections of that exciting winding are connected to the main winding to develop a D.C. exciting current in that main winding; and that exciting current enables those embodiments to provide desirably-high outputs. It is, therefore, an object of the present invention to provide an electric generator with an exciting winding that has sections thereof wound on poles that have turns of the field winding wound thereon, and to connect that exciting winding to sections of the main winding to develop a D.C. exciting current in that main winding.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

BRIEF DESCRIPTION OF THE DRAWING

FIG. 1 is a view of one preferred embodiment of rotor and stator for an electric generator which is made in accordance with the principles and teachings of the present invention;

FIG. 2 is a diagram showing the windings of the embodiment of FIG. 1;

FIG. 3 is a view of a second preferred embodiment of rotor and stator for an electric generator which is made in accordance with the principles and teachings of the present invention;

FIG. 4 is a diagram showing the windings of the embodiment of FIG. 3;

DETAILED DESCRIPTION OF PREFERRED EMBODIMENTS

Figure 5:
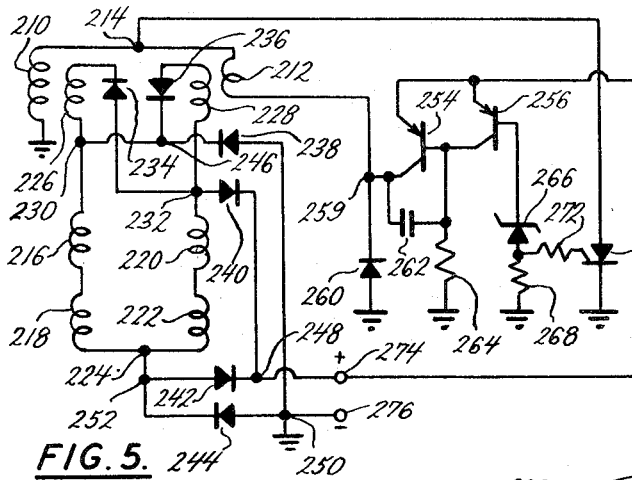
FIG. 5 is a wiring diagram of a further preferred embodiment of electric generator which is made in accordance with the principles and teachings of the present invention, and which has a control circuit that enables that generator to serve as a battery charger.

Referring particularly to FIGS. 1 and 2, the numeral 20 generally denotes the rotor of one preferred embodiment of electric generator which is made in accordance with the principles and teachings of the present invention. That rotor is annular in configuration; and it is made from a number of identical, coaxial laminations of magnetic material—such as steel. Each of those laminations is coated to minimize the flow of eddy currents through that rotor. A number of inwardly-extending, circumferentially-spaced poles are formed on that rotor; and those poles are denoted by the numerals 22, 24, 26, 28, 30, 32, 34, 36, 38, 40, 42 and 44.

In one preferred embodiment, the rotor 20 has twelve (12) poles, the center-to-center spacing of those poles is thirty degrees (30°), the outer diameter of that rotor is six and four hundred and sixteen thousandths (6.416) inches, the diametric distance between the pole faces is five and one hundred and seventy-five thousandths (5.175) inches, the height of each pole is three hundred and thirty-eight thousandths (0.338) of an inch, and the width of each pole face is six thousand seven hundred and seventy-four ten thousandths (0.6774) of an inch. That rotor is secured to the shaft of an engine which will supply the motive power for the electric generator. The metallic content of the laminations, the coating on those laminations, the manner of interconnecting those laminations to form the rotor 20, and the mounting of that rotor are standard and usual and are not, per se, parts of the present invention.

The numeral 46 generally denotes the stator for the embodiment of electric generator of FIGS. 1 and 2; and it is annular in configuration, it is formed from a number of identical, coaxial laminations of magnetic material, and it has a number of outwardly-extending, circumferentially-spaced poles. Each of those laminations is coated to minimize the flow of eddy currents through the stator. There are eight (8) poles with center-to-center spacings of forty-five degrees (45°); and those poles are denoted by the numerals 48, 50, 52, 54, 56, 58, 60 and 62. The ratio of the poles of the rotor 20 to the poles of the stator 46 is one and one-half to one (1.5:1).

In the one preferred embodiment, the inner diameter of the stator 46 is two and seventy-eight hundredths (2.78) inches, the diametric distance between the pole faces is five and one hundred and fifty-five thousandths (5.155) inches, the height of each pole is six hundred and eighty-five thousandths (0.685) of an inch, and the width of each pole face is four thousand three hundred and seventy-five thousandths (0.4375) of an inch. The air gap between each pole face of rotor 20 and a confronting pole face of stator 46 is ten thousandths (0.010) of an inch. That stator is secured to the housing of the engine, and it is mounted so it is concentric with the rotor 20; and it and that rotor are one (1) inch long.

During part of each revolution of the rotor 20, the axes of the poles 22, 28, 34 and 40 of that rotor will be in register with the axes of the stator poles 48, 52, 56 and 60, and the axes of the rotor poles 24, 26, 30, 32, 36, 38, 42 and 44 will be out of register with the axes of all of the poles on that stator. During a succeeding part of that revolution, the axes of the rotor poles 26, 32, 38 and 44 will be in register with the axes of stator poles 50, 54, 58 and 62, and the axes of the rotor poles 22, 24, 28, 30, 34, 36, 40 and 42 will be out of register with the axes of all of the poles on that stator. During further succeeding parts of that revolution, the axes of four further rotor poles will be in register with the axes of stator poles 48, 52, 56 and 60, and the axes of the rest of the rotor poles will be out of register with the axes of all of the poles on that stator. During still further succeeding parts of that revolution, the axes of four further rotor poles will be in register with the axes of stator poles 50, 54, 58 and 62, and the axes of the rest of the rotor poles will be out of register with the axes of all of the poles on that stator.

The numeral 64 denotes the field winding for the stator 46; and that field winding is wound around just two of the poles of that stator. Specifically, that field winding is wound around stator pole 56 to form a magnetic field of one polarity, and it is wound around stator pole 58 to form a magnetic field of opposite polarity. In the one preferred embodiment, that winding is made from twenty-four (24) A.W.G. copper wire; and it has two hundred and twenty (220) turns on each of those poles. The terminals 66 of that field winding are selectively connectable to a source of direct current, not shown, by a switch, not shown. That source of direct current could be a battery; but that source is not, per se, a part of the present invention.

The numeral 68 denotes an exciting winding which is wound on the pole 56 to form a magnetic field of the one polarity and the numeral 72 denotes an exciting winding that is wound on the pole 58 to form a magnetic field of the opposite polarity. In the one preferred embodiment, each of those exciting windings is made from eighteen (18) A.W.G. copper wire; and each of those exciting windings has one hundred and thirty-two (132) turns.

The electric generator of FIGS. 1 and 2 has a main winding with three sections 59, 61 and 63 that are wound, respectively, onto poles 50, 54 and 62 of the stator 46. A further main winding has three sections 65, 67 and 69 that are wound, respectively, onto poles 48, 52 and 60 of that stator. In the one preferred embodiment, each of those main windings is made from twelve (12) A.W.G. copper wire; and each section of each of those windings has forty-four (44) turns.

The sections 59, 61 and 63 of the main winding are wound so each of the sections 61 and 63 produces a magnetic field which has the same (one) polarity as the magnetic field produced by the exciting winding 68 and by the portion of field winding 64 that is wound on stator pole 56 and so section 59 provides a magnetic field which has the opposite polarity. The sections 65, 67 and 69 of the main winding are wound so each of the sections 67 and 69 produces a magnetic field which has the same (opposite) polarity as the magnetic field produced by the exciting winding 72 and by the portion of field winding 64 that is wound on stator pole 58 and so section 65 produces a magnetic field which has the one polarity. Where the various sections of the main winding are so wound, the stator 46 will have four north poles and four south poles—with each north pole interposed between a south pole and another north pole, and with each south pole interposed between a north pole and another south pole. As a result, each north pole will have a south pole close to it; and the flux lines that flow through one of those poles will also flow through the other of those poles. During a given instant, a large number of flux lines will be flowing through poles 48 and 52 and through poles 56 and 60, while a small number of flux lines will be flowing through poles 50 and 54 and through poles 58 and 62. During the next instant, a large number of flux lines will be flowing through poles 50 and 54 and through poles 58 and 62, while a small number of flux lines will be flowing through poles 48 and 52 and through poles 56 and 60. As a result, the poles 48 and 62 will alternate in providing magnetic fields of the one polarity; but, at any given instant, at least one of those poles will be providing a magnetic field of that one polarity for the upper left-hand quadrant of the stator 46. Similarly, the poles 54 and 56 will alternate in providing magnetic fields of the one polarity; but, at any given instant, at least one of those poles will be providing a magnetic field of that one polarity for the lower right-hand quandrant of that stator. The poles 50 and 52 will alternate in providing magnetic fields of the opposite polarity; but, at any given instant, at least one of those poles will be providing a magnetic field of that opposite polarity for the upper right-hand quadrant of stator 46. Also, the poles 58 and 60 will alternate in providing magnetic fields of the opposite polarity; but, at any given instant, at least one of those poles will be providing a magnetic field of that opposite polarity for the lower left-hand quadrant of that stator.

A junction 75 connects one end of each of those sections of main winding to an output terminal 84 of the generator. A junction 77 connects the other ends of the sections 59, 61 and 63 to one end of the exciting winding 72, to the anode of a diode 78, and to the anode of a diode 74. The diode 78 has its cathode connected to a terminal 86 of the generator by a junction 81; and the cathode of the diode 74 is connected to one end of the exciting winding 68. A diode 70 and a junction 79 connect the other end of the exciting winding 72 to the other ends of the main winding sections 65, 67 and 69; and the other end of the exciting winding 68 is connected to those other ends of those main winding sections by the junction 79. A diode 82 and junction 79 connect the junction 81 to those other ends of the main winding sections 65, 67 and 69.

Direct current will flow in the field winding 64 whenever the terminals 66 are connected to the source of direct current; and that winding will develop a magnetic field in the pole 58 which will have a fixed polarity, and it will develop a magnetic field in the pole 56 which will be of opposite polarity. The rotor 20 will serve as parts of the paths for the magnetic fields which are developed in the poles 56 and 58 by the field winding 64; and the movement of that rotor relative to the stator 46 will provide substantial variations in the reluctances of those paths. For example, when the axis of one of the poles on the rotor 20 is squarely aligned with the axis of the pole 56, the pole 58 will be out of register with all of the poles of that rotor; and hence the reluctance of the path for the magnetic field of pole 58 will be at its maximum value whereas the reluctance of the path for the magnetic field of pole 56 will be at its minimum value. After that rotor has rotated thirty degrees (30°), the axis of the pole 58 will be in register with the axis of a pole on that rotor, but the pole 56 will be out of register with all of the poles on that rotor; and the reluctance of the path for the magnetic field of pole 56 will be at its maximum value whereas the reluctance of the path for the magnetic field of pole 58 will be at its minimum value. This means that the reluctances of the paths for the magnetic fields of each of the poles 56 and 58 will respond to rotation of the rotor 20 to repeatedly rise and fall to their maximum and minimum values.

When the reluctance of the magnetic path of stator pole 56 is a minimum, the section of field winding 64 on that pole will cause a large number of flux lines to pass through the exciting winding 68; and, conversely, when the reluctance of that path is a maximum, far fewer flux lines will pass through that exciting winding. When the reluctance of the magnetic path of stator pole 58 is a minimum, the section of field winding 64 on that pole will cause a large number of flux lines to pass through the exciting winding 72; and, conversely, when the reluctance of that path is a maximum, far fewer flux lines will pass through that exciting winding. The exciting windings 68 and 72 will respond to the changes in the number of flux lines passing through them to tend to cause current to flow through them. As a rotor pole, which is in register with the stator pole 58, responds to rotation of rotor 20 to start moving away from the latter pole, the reluctance of the magnetic path through that stator pole will begin to increase and hence the inductance of the exciting winding 72 will begin to decrease. Thereupon, current will begin to flow through that exciting winding, diode 70, junction 79, the parallel-connected main winding sections 65, 67 and 69, junction 75 and the parallel-connected main winding sections 59, 61, and 63 to junction 77. The resulting voltage drop across exciting winding 72 will make the voltage at junction 79 more positive than the voltage at junction 77, and hence will back-bias the diode 74. As a result, no current will be able to flow through the exciting winding 68.

The current which the exciting winding 72 caused to flow through the parallel-connected main winding sections 59, 61 and 63 will enable those main winding sections to develop magnetic fields which will coact with the changes in reluctances of the magnetic paths in the poles 50, 54 and 62 to cause those main winding sections to generate current which will flow from terminal 86 through an external load, not shown, to terminal 84, and then via junction 75, those parallel-connected main winding sections, junction 77, diode 78, and junction 81 to terminal 86. The current which the exciting winding 72 caused to flow through the parallel-connected main winding sections 65, 67 and 69 will enable those main winding sections to develop magnetic fields; but those magnetic fields will not coact with the changes in reluctances of the magnetic paths in the poles 48, 52 and 60 to cause those main winding sections to generate current which will flow from junction 75 to terminal 86 because the diode 82 will prevent any such current flow.

As the rotor pole, which was in register with the stator pole 58, begins to move away from the latter pole, a further rotor pole will begin to move into register with the stator pole 56. The consequent decrease in the reluctance of the magnetic path through the pole 56 will tend to cause the exciting winding 68 to generate current; but sufficient current will be flowing through the exciting winding 72 to cause the junction 79 to continue to be sufficiently positive relative to the junction 77 to continue to back-bias the diode 74. The parallel-connected main winding sections 65, 67 and 69 will respond to the decreases of reluctance of the magnetic paths through the poles 48, 52 and 60 to tend to cause current to flow from junction 75 to terminal 86, but the diode 82 will continue to prevent such current flow. The action of diode 82 in keeping the parallel-connected main winding sections 65, 67 and 69 from causing current to flow from junction 75 to terminal 86 is important, because it frees the field winding 64 of the need of supplying sufficient ampere turns to overcome the tendency of those main winding sections to cause current to flow from junction 75 to terminal 86. As a result, the number of externally-excited ampere turns in that field winding can be kept small.

Subsequently, after a rotor pole has moved into register with, and has started to move away from, the stator pole 56, the reluctance of the magnetic path through that stator pole will begin to increase and hence the inductance of the exciting winding 68 will begin to decrease. Thereupon, current will begin to flow through that exciting winding, junction 79, the parallel-connected main winding sections 65, 67 and 69, junction 75, the parallel-connected main winding sections 59, 61 and 63, junction 77 and diode 74. That flow of current—which is in the same direction as the flow of current that was generated by the exciting winding 72 as a rotor pole moved away from the stator pole 58—will cause the voltage at the junction 79 to be more positive than the voltage at the junction 77, and hence will back-bias the diode 70. As a result, no current will be able to flow through the exciting winding 72.

The current which the exciting winding 68 caused to flow through the parallel-connected main winding sections 65, 67 and 69 will enable those main winding sections to develop magnetic fields which will coact with the changes in reluctances of the magnetic paths in the poles 48, 52 and 60 to cause those main winding sections to generate current which will flow from junction 75 through terminal 84, the external load, terminal 86, junction 81, diode 82, and junction 79 to those parallel-connected main winding sections. The current which the exciting winding 68 caused to flow through the parallel-connected main winding sections 59, 61 and 63 will enable those main winding sections to develop magnetic fields; but those magnetic fields will not coact with the changes in reluctances of the magnetic paths in the poles 50, 54 and 62 to cause those main winding sections to generate current which will flow from terminal 86 to junction 75 because the diode 78 will prevent any such current flow.

All of this means (1) that rotation of the rotor 20 will continually vary the number of magnetic lines, from the field winding 64, that will pass through the exciting windings 68 and 72, (2) that those exciting windings will alternately cause exciting current to flow unidirectionally and serially through the parallel-connected main winding sections 59, 61 and 63 and then through the parallel-connected main winding sections 65, 67 and 69, (3) that during one-half of the thirty degree (30°) movements of rotor 20 the parallel-connected main winding sections 59, 61 and 63 will cause current to flow from terminal 86 through the external load to the terminal 84, (4) that during the alternate thirty degree (30°) movements of that rotor the parallel-connected main winding sections 65, 67 and 69 will cause current to flow from terminal 84 through that external load to terminal 86, and (5) that the field winding 64 never has to supply ampere turns to overcome magnetic lines generated by either of the groups of the parallel-connected main winding sections 59, 61 and 63 or 65, 67 and 69. As a result, a substantial output can be obtained from the electric generator of FIGS. 1 and 2 with a smaller-than-normal number of ampere turns supplied by the field winding 64.

When the electric generator of FIGS. 1 and 2 is used as a battery-charging generator, it will be equipped with a control circuit which is similar to the control circuit of FIG. 5 and which will respond to the voltage across the output terminals 84 and 86 to vary the amount of current which is supplied to the field winding 64. Also, a full wave rectifier will be connected to those output terminals; and its output terminals will be connected to the battery. The control circuit will supply just enough current to the field winding 64 to cause the generator to develop twelve (12) volts D.C. across the output terminals of the full wave rectifier. That control circuit and that full wave rectifier will be of standard and usual design and they are not, per se, parts of the present invention.

Where the rotor 20 is rotated at a speed of six hundred revolutions per minute (600 rpm), the frequency of the output voltage will be one hundred and twenty Hertz (120 Hz). Where that rotor is rotated at a speed of three thousand revolutions per minute (3000 rpm), the frequency of the output voltage will be six hundred Hertz (600 Hz). By rotating that rotor at desired speeds between six hundred revolutions per minute (600 rpm) and three thousand revolutions per minute (3000 rpm), the frequency of the output voltage can be set to any desired value between one hundred and twenty Hertz (120 Hz) and six hundred Hertz (600 Hz).

If desired, the main winding sections 59, 61 and 63 could be connected in series rather than in parallel—as shown by FIGS. 1 and 2. In such event, the main winding sections 65, 67 and 69 also would be connected in series rather than in parallel—as shown by FIGS. 1 and 2. Where those various main winding sections are connected in series, rather than in parallel, fewer turns of larger diameter wire must be used in winding those sections.

The parallel-connected main winding sections 59, 61 and 63 will develop a voltage that will, with reference to the junction 75, have the same phase and the same frequency as the voltage which will be developed by the parallel-connected main winding sections 65, 67 and 69. As a result, no A.C. will be developed between the junctions 77 and 79. However, the diode 78 will permit A.C. to flow through the parallel-connected main winding sections 59, 61 and 63 and through the external load as rotor poles move away from the stator poles 50, 54 and 62; and the diode 82 will permit A.C. to flow through the parallel-connected main winding sections 65, 67 and 69 and through that external load as rotor poles subsequently move away from the stator poles 48, 52 and 60. Because the A.C. current in each of the parallel-connected main winding sections 59, 61 and 63 and in each of the parallel-connected main winding sections 65, 67 and 69 will flow in the same direction as the D.C. exciting current through those parallel-connected main winding sections, the ampere turns provided by the exciting windings 68 and 70—and hence the ampere turns provided by the field winding 64—do not have to overcome the magnetic fields generated by the A.C.

Figure 8:
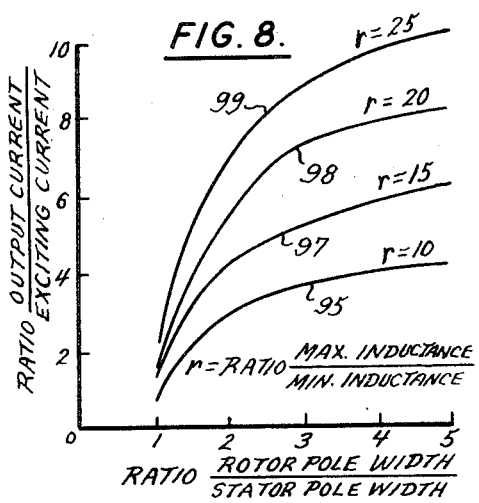
FIG. 8 shows curves which indicate how changes in the ratios of maximum inductance to minimum inductance, in the windings of generators made in accordance with the principles and teachings of the present invention, can change the ratio of rectified output current to exciting current in response to changes in the ratio of rotor pole widths to stator pole widths.

By winding all of the parallel-connected main winding sections 59, 61 and 63 on stator poles that are in register with three rotor poles at one instant, and that are out of register with all of the rotor poles at another instant, the present invention enables those parallel-connected main winding sections to have maximum inductance during that one instant and to have minimum inductance during that other instant. Similarly, by winding all of the parallel-connected main winding sections 65, 67 and 69 on stator poles that are in register with three rotor poles at the other instant, and that are out of register with all of the rotor poles at the one instant, the present invention enables those parallel-connected main winding sections to have maximum inductance during that one instance. The resulting ratio of maximum to minimum inductance for the parallel-connected main winding sections 59, 61 and 63, the resulting ratio of maximum to minimum inductance for the parallel-connected main winding sections 65, 67 and 69, can, within practical design limitations, be as great as thirty to one (30:1). As shown by FIG. 8—with any given ratio of rotor pole width to stator pole width—the greater the ratio of maximum to minimum inductance, the greater the ratio of rectified output current to exciting current from the exciting windings 68 and 72.

The ordinates represent the ratios of maximum or limiting output currents (output current) to currents from the exciting windings 68 and 72 (exciting current). The abscissas represent the ratios of rotor pole widths to stator pole widths. The curve 95 represents the changes in the current ratios due to changes in the pole width ratios when the ratio of maximum to minimum inductance is ten (10), and the curve 97 represents the changes in the current ratios due to changes in the pole width ratios when the ratio of maximum to minimum inductance is fifteen (15). The curve 98 represents the changes in the current ratios due to changes in the pole width ratios when the ratio of maximum to minimum inductance is twenty (20), and the curve 99 represents the changes in the current ratios due to changes in the pole width ratios when the ratio of maximum to minimum inductance is twenty-five (25). By providing a maximum-to-minimum inductance ratio of two (2) or greater, the present invention provides importantly-large ratios of rectified output current to the current from the exciting windings 68 and 72.

The voltage that is developed by the exciting winding 68 is a function of the changes in the number of magnetic lines which the field winding 64 causes to flow through the pole 56 as the rotation of the rotor 20 varies the reluctance of the path for those magnetic lines. Similarly, voltage that is developed by the exciting winding 72 is a function of the changes in the number of magnetic lines which the field winding 64 causes to flow through the pole 58 as the rotation of the rotor 20 varies the reluctance of the path for those magnetic lines. The half of the A.C. voltage that is developed by the parallel-connected main winding sections 59, 61 and 63 is a function of the exciting current that is supplied by the exciting winding 72 and also is a function of the changes—caused by the variations in reluctance of the magnetic paths in the stator poles 50, 54 and 62 as the rotor 20 rotates relative to those poles—in the magnetic lines generated by those parallel-connected main winding sections as that exciting current flows through those parallel-connected main winding sections. Similarly, the half of the A.C. voltage that is developed by the parallel-connected main winding sections 65, 67 and 69 is a function of the exciting current that is supplied by the exciting winding 68 and also is a function of the changes—caused by the variations in reluctance of the magnetic paths in the stator poles 48, 52 and 60 as the rotor 20 rotates relative to those poles—in the magnetic lines generated by those parallel-connected main winding sections as that exciting current flows through those parallel-connected main winding sections. The formula for the portion of the A.C. voltage which is generated by each of the parallel-connected main winding sections 59, 61, 63, 65, 67, and 69 is:

$$E = L(dI/dT) + I(dL/Dt)$$

where E is the voltage developed by that section, L is the inductance of that section, I is the exciting current flowing through that section, dI/dT is the rate of change of exciting current through that section per unit of time, and dL/dT is the rate of change of inductance of that section per unit of time.

Referring particularly to FIGS. 3 and 4, the numeral 100 generally denotes the rotor of a second preferred embodiment of electric generator that is made in accordance with the principles and teachings of the present invention. That rotor is generally circular in cross section; and it is composed of a number of laminations of magnetic material. Those laminations are coated to minimize any flow of eddy currents through that rotor. Six outwardly-extending circumferentially-spaced poles are formed on that rotor; and they are denoted by the numerals 102, 104, 106, 108, 110 and 112. The center-to-center spacing of those poles is sixty degrees (60°). That rotor is secured to the shaft of an engine which will supply the motive power for the generator of FIGS. 3 and 4.

The numeral 114 generally denotes the stator for that generator, and it is generally annular in configuration. Twelve (12) poles 116, 118, 120, 122, 124, 126, 128, 130, 132, 134, 136 and 138 extend radially inwardly of that stator. The center-to-center spacing of those poles is thirty degrees (30°). The ratio of the six (6) poles of the rotor 100 to the twelve (12) poles of the stator 114 is one to two (1:2). The circumferential width of each pole face on the rotor 100 does not exceed the center-to-center spacing of the poles on the stator 114; and hence that rotor can be set, relative to that stator, so every other pole on that stator has a rotor pole in register with it and so none of the intervening poles on that stator has a rotor pole in register with it. That stator is secured to the housing of the engine, and it is mounted so it is concentric with the rotor 100.

During part of each revolution of the rotor 100, the axes of the poles 116, 120, 124, 128, 132 and 136 on the stator 114 will be in register with the axes of poles on that rotor, and the axes of the stator poles 118, 122, 126, 130, 134 and 138 will be out of register with the axes of all of the poles on that rotor. During another part of that revolution, the axes of the stator poles 118, 122, 126, 130, 134 and 138 will be in register with the axes of the poles on the rotor 100, and the axes of poles the 116, 120, 124, 128, 132 and 136 will be out of register with the axes of all of the poles on that rotor.

The numeral 140 denotes the field winding for the stator 114; and that field winding is wound around just two of the poles of that stator. Specifically, that field winding is wound around stator pole 116 to generate a magnetic field of one polarity and is wound around stator pole 138 to generate a magnetic field of opposite polarity. The terminals 142 of that field winding are selectively connectable to a source of direct current, not shown, by a switch, not shown. That source of direct current could be a battery; but that source is not, per se, a part of the present invention. The numeral 164 denotes an exciting winding which is wound on the pole 138 to generate a magnetic field of the same polarity as the magnetic field generated by the section of field winding on that pole; and the numeral 166 denotes an exciting winding which is wound on the pole 116 to generate a magnetic field of the same polarity as the magnetic field generated by the section of field winding on that pole.

The electric generator of FIGS. 3 and 4 has a main winding that has one-half thereof constituted by five sections 144, 146, 148, 150 and 152 that are wound, respectively, onto poles 118, 122, 126, 130 and 134 of the stator 114 and that are connected in series. The other half of that main winding has five sections 154, 156, 158, 160 and 162 that are wound, respectively, onto poles 120, 124, 128, 132 and 136 of that stator and that are connected in series.

The sections 144, 146, 148, 150 and 152 of the main winding are wound so each of the sections 144, 148 and 152 produces a magnetic field which has the same (one) polarity as the magnetic field produced by the exciting winding 166 and by the portion of field winding 140 that is wound on stator pole 116 and so each of the sections 146 and 150 produces a magnetic field which has the opposite polarity. The sections 154, 156, 158, 160 and 162 are wound so each of the sections 154, 158 and 162 produces a magnetic field which has the same (opposite) polarity as the magnetic field produced by the exciting winding 164 and by the portion of field winding 140 that is wound on stator pole 138 and so each of the sections 156 and 160 produces a magnetic field which has the one polarity. Where the various sections of the main winding are so wound, the stator 114 will have six north poles and six south poles—with each north pole interposed between a south pole and another north pole, and with each south pole interposed between a north pole and another south pole. As a result, each north pole will have a south pole close to it; and the flux lines that flow through one of those poles will also flow through the other of those poles. During a given instant, a large number of flux lines will be flowing through poles 116 and 120, through poles 124 and 128 and through poles 132 and 136, while a small number of flux lines will be flowing through poles 118 and 122, through poles 126 and 130 and through poles 134 and 138. During the next instant, a large number of flux lines will be flowing through poles 118 and 122, through poles 126 and 130 and through poles 134 and 138, while a small number of flux lines will be flowing through poles 116 and 120, through poles 124 and 128 and through poles 132 and 136. As a result, the poles 116 and 118 will alternate in providing magnetic fields of the one polarity; but, at any given instant, at least one of those poles will be providing a magnetic field of that one polarity. Similarly, the poles of the pole group 124 and 126, and of the pole group 132 and 134, will alternate in providing magnetic fields of the one polarity; but, at any given instant, at least one pole of each of those pole groups will be providing a magnetic field of that one polarity. The poles of the pole group 120 and 122 will alternate in providing magnetic fields of the opposite polarity; but, at any given instant, at least one of those poles will be providing a magnetic field of that opposite polarity. Also, the poles of the pole group 128 and 130, and of the pole group 136 and 138, will alternate in providing magnetic fields of the opposite polarity; but, at any given instant, at least one pole of each of those pole groups will be providing a magnetic field of that opposite polarity.

A junction 180 connects one end of section 152, and hence one end of the one half of the main winding, to an output terminal 174 of the generator; and that junction also connects one end of section 162, and hence one end of the other half of the main winding, to that output terminal. An output terminal 172 is connected to one end of section 144, and hence to the other end of the one half of the main winding, by a junction 194, a diode 204 and a junction 178. A junction 188 and a diode 192 and the junction 194 connect one end of section 154, and hence the other end of the other half of the main winding, to the output terminal 172. Junctions 198 and 178 connect one end of exciting winding 164 to the one end of section 144, and hence to the other end of the one half of the main winding; and the junction 188, a junction 200 and a diode 196 connect the one end of section 154, and hence the other end of the other half of the main winding, to the other end of that exciting winding. A diode 202 and junctions 198 and 178 connect one end of exciting winding 166 to one end of section 144 and hence to the other end of the one half of the main winding. Junctions 188 and 200 connect the one end of section 154, and hence the other end of the other half of the main winding, to the other end of that exciting winding. The output terminals 172 and 174 are the A.C. output terminals of the generator of FIGS. 3 and 4.

The numerals 168 and 170 denote the D.C. output terminals of that generator; and a diode 176 connects the terminal 168 to junction 178, while a diode 186 and a junction 182 connect that terminal to junction 180. A diode 190 connects junction 188 to terminal 170, while junction 182 and a diode 184 connect junction 180 to that terminal.

Direct current will flow in the field winding 140 whenever the terinals 142 are connected to the source of direct current; and that winding will develop a magnetic field in the pole 116 which will have a fixed polarity, and it will develop a magnetic field in the pole 138 which will be of opposite polarity. The rotor 100 will serve as parts of the paths for the magnetic fields which are developed by the field winding 140 in the stator poles 116 and 138; and the movement of that rotor relative to the stator 114 will provide substantial variations in the reluctances of those paths. For example, when the axis of one of the poles on the rotor 100 is squarely aligned with the axis of the stator pole 116, the stator pole 138 will be out of register with all of the poles of that rotor; and hence the reluctance of the path for the magnetic field of pole 116 will be at its minimum value, whereas the reluctance of the path for the magnetic field of the pole 138 will be at its maximum value. After that rotor has rotated sixty degrees (60°), the axis of the stator pole 138 will be in register with the axis of a pole on that rotor, but the stator pole 116 will be out of register with all of the poles on that rotor; and the reluctance of the path for the magnetic field of pole 138 will be at its minimum value, whereas the reluctance of the path for the magnetic field of pole 116 will be at its maximum value. This means that the reluctances of the paths for the magnetic fields of the poles 116 and 138 will respond to rotation of the rotor 100 to repeatedly rise and fall to their maximum and minimum values.

When the reluctance of the path for the magnetic field of pole 116 is a minimum, a large number of flux lines will pass through the exciting winding 166; and, conversely, when the reluctance of that path is a maximum, far fewer flux lines will pass through that winding. Similarly, when the reluctance of the path for the magnetic field of pole 138 is a minimum, a large number of flux lines will pass through the exciting winding 164; and, conversely, when the reluctance of that path is a maximum, far fewer flux lines will pass through that winding. The exciting windings 164 and 166 will respond to the changes in the numbers of flux lines passing through them to tend to cause current to flow through them. As a rotor pole, which is in register with the stator pole 116, responds to rotation of rotor 100 to start moving away from the latter pole, the reluctance of the magnetic path through that stator pole will begin to increase and hence the inductance of the exciting winding 166 will begin to decrease. Thereupon, current will begin to flow through that exciting winding, diode 202, junctions 198 and 178, the main winding sections 144, 146, 148, 150 and 152, junction 180, main winding sections 162, 160, 158, 156 and 154, and junctions 188 and 200 to the other end of that exciting winding. The resulting voltage drop across exciting winding 166 will make the voltage at junction 198 more positive than the voltage at junction 200, and hence will back-bias the diode 196. As a result, no current will be able to flow through the exciting winding 164.

The current which the exciting winding 166 caused to flow through the main winding sections 162, 160, 158, 156 and 154 will enable those main winding sections to develop magnetic fields which will coact with the changes in reluctances of the magnetic paths in the poles 136, 132, 128, 124 and 120 to cause those main winding sections to generate current which will flow from terminal 172 through an external load, not shown, to terminal 174 and then via junction 180 and those main winding sections, junction 188, diode 192 and junction 194 to terminal 172. The current which the exciting winding 166 caused to flow through the main winding sections 144, 146, 148, 150 and 152 will enable those main winding sections to develop magnetic fields; but those magnetic fields will not coact with the changes in reluctances of the magnetic paths in the poles 118, 122, 126, 130 and 134 to cause those main winding sections to generate current which will flow from junction 180 to terminal 172 because the diode 204 will prevent any such current flow.

As the rotor pole, which was in register with the stator pole 116, begins to move away from the latter pole, a further rotor pole will begin to move into register with the stator pole 138. The consequent decrease in the reluctance of the magentic path through the pole 138 will tend to cause the exciting winding 164 to generate current; but sufficient current will be flowing through the exciting winding 166 to cause the junction 198 to continue to be sufficiently positive relative to the junction 200 to continue to back-bias the diode 196. The main winding sections 144, 146, 148, 150 and 152 will respond to the decreases of reluctance of the magnetic paths through the poles 118, 122, 126, 130 and 134 to tend to cause current to flow from junction 180 to terminal 172, but the diode 204 will continue to prevent such current flow. The action of diode 204 in keeping the main winding sections 144, 146, 148, 150 and 152 from causing current to flow from junction 180 to terminal 172 is important, because it frees the field winding 140 of the need of supplying sufficient ampere turns to overcome the tendency of those main winding sections to cause current to flow from junction 180 to terminal 172. As a result, the number of externally-excited ampere turns in that field winding can be kept small.

Subsequently, after a rotor pole has moved into register with, and has started to move away from, the stator pole 138, the reluctance of the magnetic path through that stator pole will begin to increase and hence the inductance of the exciting winding 164 will begin to decrease. Thereupon, current will begin to flow through that exciting winding, junctions 198 and 178, the main winding sections 144, 146, 148, 150 and 152, junction 180, the main winding sections 162, 160, 158, 156 and 154, junctions 188 and 200, and diode 196. That flow of current—which is in the same direction as the flow of current that was generated by the exciting winding 166 as a rotor pole moved away from the stator pole 116—will cause the voltage at the junction 198 to be more positive than the voltage at the junction 200, and hence will back-bias the diode 202. As a result, no current will be able to flow through the exciting winding 166.

The current which the exciting winding 164 caused to flow through the main winding sections 144, 146, 148, 150 and 152 will enable those main winding sections to develop magnetic fields which will coact with the changes in reluctances of the magnetic paths in the poles 118, 122, 126, 130 and 134 to cause those main winding sections to generate current which will flow from junction 180 through terminal 174, the external load, terminal 172, junction 194, diode 204, and junction 178 to those main winding sections. The current which the exciting winding 164 caused to flow through the main winding sections 162, 160, 158, 156 and 154 will enable those main winding sections to develop magnetic fields; but those magnetic fields will not coact with the changes in reluctances of the magnetic paths in the poles 136, 132, 128, 124 and 120 to cause those main winding sections to generate current which will flow from terminal 172 to junction 180 because the diode 192 will prevent any such current flow.

All of this means (1) that rotation of the rotor 100 will continually vary the number of magnetic lines, from the field winding 140, that will pass through the exciting windings 164 and 166, (2) that those exciting windings will alternately cause exciting current to flow unidirectionally and serially through the main winding sections 144, 146, 148, 150 and 152 and then through the main winding sections 162, 160, 158, 156 and 154, (3) that during one-half of the sixty degree (60°) movements of rotor 100 the main winding sections 144, 146, 148, 150 and 152 will cause current to flow from terminal 174 through the external load to the terminal 172, (4) that during the alternate sixty degree (60°) movements of that rotor the main winding sections 162, 160, 158, 156 and 154 will cause current to flow from terminal 172 through that external load to terminal 174, and (5) that the field winding 140 never has to supply ampere turns to overcome magnetic lines generated by either of the groups of the main winding sections 144, 146, 148, 150 and 152 or 162, 160, 158, 156 and 154. As a result, a substantial output can be obtained from the electric generator of FIGS. 3 and 4 with a smaller-than-normal number of ampere turns supplied by the field winding 140.

Whenever the generator of FIGS. 3 and 4 is connected to a D.C. load, current will flow from terminal 170 through that load to terminal 168 and then through one or the other of two paths to terminal 170. One of those paths includes diode 176, junction 178, main winding sections 144, 146, 148, 150 and 152, junctions 180 and 182, and diode 184. At that time, the voltage at junction 182 will be substantially more positive than the voltage at terminal 168, and hence diode 186 will be back-biased. The other of those paths includes diode 186, junctions 182 and 180, main winding sections 162, 160, 158, 156 and 154, junction 188 and diode 190. At such time, the voltage at terminal 170 will be substantially more positive than the voltage at junction 180, and hence diode 184 will be back-biased.

One of the primary differences between the generator of FIGS. 3 and 4 and the generator of FIGS. 1 and 2 is the mounting of rotor 100 within the stator 114, whereas the rotor 20 encircles the stator 46. Another difference is the one to two (1:2) rotor-to-stator pole ratio of FIGS. 3 and 4 versus the one and one-half to one (1.5:1) rotor-to-stator pole ratio of FIGS. 1 and 2. Still another difference is the A.C. and D.C. outputs of FIGS. 3 and 4 versus the A.C. output of FIGS. 1 and 2. Yet another difference is the series connections of the sections of each half of the main winding of FIGS. 3 and 4 versus the parallel connections of the sections of each half of the main winding of FIGS. 1 and 2. The principle of operation of the generator of FIGS. 3 and 4 is, however, the same as the principle of operation of the generator of FIGS. 1 and 2.

A third embodiment of electric generator has the rotor disposed within the stator, and hence is similar to the embodiment of FIGS. 3 and 4. The stator of that third embodiment has a diameter of eight and five hundred and thirty-six thousandths (8.536) inches, and has eight (8) inwardly-extending poles. The diametric distance between pole faces is five and seven hundred and eighty-six thousandths (5.786) inches. Each pole is one and twelve hundred and eighty-eight ten thousandths (1.1288) inches wide, and each pole has a height of seventy-five hundredths (0.75) of an inch. The center-to-center spacings of the poles are forty-five degrees (45°). The rotor has four (4) outwardly-extending poles, and the diametric distance between the faces of those poles is five and seventy-five hundredths (5.75) inches. Each pole is two and two thousand and four ten-thousandths (2.2004) inches wide; and each pole has a height of six hundred and twenty-five thousandths (0.625) of an inch. The center-to-center spacings of the poles are ninety degrees (90°). The air gap between the faces of confronting poles on the rotor and stator is eighteen thousandths (0.018) of an inch. The length of the stator and the length of the rotor are five (5) inches. The rotor is secured to the shaft of the engine or other source of motive power for the third embodiment; and the stator is secured to the housing of that engine. That stator and that rotor will be held so they are precisely concentric.

Each half of the main winding has three (3) sections that are connected in series; and each section has four (4) turns of rectangular wire which is six hundred and twenty-five thousandths (0.625) by one hundred and thirty-two thousandths (0.132) of an inch. The exciter winding has two sections; and each of those sections has four (4) turns of rectangular wire which is six hundred and twenty-five thousandths (0.625) by five hundred and eighty-four ten thousandths (0.0584) inches. The field winding has two sections; and each of those sections has one hundred and thirty-one (131) turns of eighteen (18) A.W.G. wire. Six poles of the stator have sections of the main winding wound thereon, and a section of the field winding and a section of the exciter winding are wound on each of the other two stator poles. The principle of operation of the third embodiment of generator is the same as the principle of operation of the generator of FIGS. 1 and 2.

When the rotor of the third embodiment is rotated at fifty-five hundred revolutions per minute (5500 rpm), it provides the following D.C. voltages:

| Current | Voltage |
| --- | --- |
| No load | 85.06 Volts |
| 200 Amperes | 55 Volts |
| 425 Amperes | 40 Volts |
| 600 Amperes | 30 Volts |
| 800 Amperes | Essentially Zero Volts |

Referring particularly to FIG. 5, the numerals 210 and 212 denote sections of a controllable field winding of a fourth preferred embodiment of electric generator which is made in accordance with the principles and teachings of the present invention. One terminal of section 210 is connected to ground; and a junction 214 connects the other terminal of that section to one terminal of the section 212. The numerals 216 and 218 denote two sections of one half of a main winding; and the numerals 220 and 222 denote two sections of the other half of that main winding. A junction 224 connects one terminal of the section 218 to one terminal of the section 222, and hence places the sections 216, 218, 222 and 220 in series relation. The numeral 226 denotes an exciting winding which has one terminal thereof connected to one terminal of section 216 by a junction 230; and the numeral 228 denotes an exciting winding which has one terminal thereof connected to one terminal of section 220 by a junction 232. The field winding section 210, the exciting winding 226, and the section 216 of the one half of the main winding are wound on one pole of a four-pole stator of the electric generator; and they are wound to provide a magnetic field of one polarity. The section 218 of that one half of the main winding is wound on a second pole of that stator; and it is wound to provide a magnetic field of the opposite polarity. The section 222 of the other half of the main winding is wound on a third pole of that stator; and it is wound to provide a magnetic field of that opposite polarity. The section 220 of the other half of the main winding, the exciting winding 228, and the field winding section 212 are wound on the fourth pole of that stator; and they are wound to provide a magnetic field of the one polarity. As a result, the field winding section 210, the field winding section 212, the exciting windings 226 and 228, and the sections 216 and 220 of the main winding coact to develop magnetic fields of the same polarity; and the sections 218 and 222 of that main winding develop magnetic fields of the opposite polarity. Each north pole is interposed between a south pole and a further north pole; and each south pole is interposed between a north pole and a further south pole. The rotor of the electric generator of FIG. 5 has eight poles.

The junction 230, between section 216 of the one half of the main winding and exciting winding 226, is connected to the cathodes of two diodes 236 and 238 by a junction 246. The other terminal of exciting winding 226 is connected to the cathode of a diode 234; and the junction 232 connects the anode of that diode to one terminal of exciting winding 228, to the anode of a diode 240, and to one terminal of section 220 of the other half of the main winding. The anode of a diode 242 and the cathode of a diode 244 are connected to the junction 224 by a junction 252. A junction 248 connects the cathodes of diodes 240 and 242 to an output terminal 274; and a junction 250 connects the anodes of the diodes 238 and 244 to a grounded output terminal 276.

The numeral 254 denotes a PNP transistor which has the collector thereof connected to the other terminal of field winding section 212 and also to the cathode of a diode 260 by a junction 259. A resistor 264 is connected between ground and the base of that transistor; and a capacitor 262 is connected between the collector and base of that transistor. The numeral 256 denotes a further PNP transistor; and the collector of that transistor is connected to the base of transistor 254 and to the upper terminal of resistor 264. A Zener diode 266 has the cathode thereof connected to the base of transistor 254; and a resistor 268 is connected between ground and the anode of that Zener diode. An SCR 270 has the cathode thereof connected to ground, and has the anode thereof connected to the junction 214. A resistor 272 is connected between the gate of that SCR and the junction between Zener diode 266 and resistor 268. The emitters of the transistors 254 and 256 are connected to the output terminal 274.

The stator will have residual magnetism within it; and rotation of the rotor relative to that stator will vary the reluctances of the various paths for that residual magnetism. The field winding section 210 and the field winding section 212 will respond to the changes in the reluctances of the poles on which they are wound to develop an A.C. voltage at junction 214 which is applied to the anode of SCR 270; and those sections also will alternately develop currents which will generate magnetic fields to which the exciting windings 226 and 228 can respond. As a rotor pole, which is in register with the stator pole on which exciting winding 228 is wound, starts moving away from that stator pole, the reluctance of the magnetic path through that stator pole will begin to increase and hence the inductance of that exciting winding will begin to decrease. Thereupon, current will begin to flow through that exciting winding, diode 236, junction 246, the main winding sections 216 and 218, junction 224, and the main winding sections 222 and 220, to junction 232. The resulting voltage drop across exciting winding 228 will make the voltage at junction 246 more positive than the voltage at junction 232, and hence will back-bias the diode 234. As a result, no current will be able to flow through the exciting winding 226.

The current which the exciting winding 228 caused to flow through the main winding sections 222 and 220 will enable those main winding sections to develop magnetic fields which will coact with the changes in reluctances of the magnetic paths in the poles on which those sections are wound to cause those main winding sections to generate current which will flow from terminal 274 through an external load, not shown, to terminal 276 and then via junction 250, diode 244, junctions 252 and 224, those main winding sections, junction 232, diode 240, and junction 248 to terminal 274. The current which the exciting winding 228 caused to flow through the main winding sections 216 and 218 will enable those main winding sections to develop magnetic fields; but those magnetic fields will not coact with the changes in reluctances of the magnetic paths in the poles, on which those sections are wound, to cause those main winding sections to generate current which will flow from junction 224 to terminal 276 because the diode 238 will prevent any such current flow.

As the rotor pole, which was in register with the stator pole for exciting winding 228, begins to move away from the latter pole, a further rotor pole will begin to move into register with the stator pole for exciting winding 226. The consequent decrease in the reluctance of the magnetic path through the pole for exciting winding 226 will tend to cause that exciting winding to generate current; but sufficient current will be flowing through the exciting winding 228 to cause the junction 246 to continue to be sufficiently positive relative to the junction 232 to continue to back-bias the diode 234. The main winding sections 218 and 216 will respond to the decreases of reluctance of the magnetic paths through the poles therefor to tend to cause current to flow from junction 224 to terminal 276, but the diode 238 will continue to prevent such current flow. The action of diode 238 in keeping the main winding sections 218 and 216 from causing current to flow from junction 224 to terminal 276 is important, because it frees the field winding section 210 of the need of supplying sufficient ampere turns to overcome the tendency of those main winding sections to cause current to flow from junction 224 to terminal 276. As a result, the number of externally-excited ampere turns in that field winding section can be kept small.

Subsequently, after a rotor pole has moved into register with, and has started to move away from, the stator pole for exciting winding 226, the reluctance of the magnetic path through that stator pole will begin to increase and hence the inductance of that exciting winding will begin to decrease. Thereupon, current will begin to flow through that exciting winding, junction 230, the main winding sections 216 and 218, junction 224, the main winding sections 222 and 220, junction 232 and diode 234. That flow of current—which is in the same direction as the flow of current that was generated by the exciting winding 228—will cause the voltage at the junction 230 to be more positive than the voltage at the junction 232, and hence will back-bias the diode 236. As a result, no current will be able to flow through the exciting winding 228.

The current which the exciting winding 226 caused to flow through the main winding sections 216 and 218 will enable those main winding sections to develop magnetic fields which will coact with the changes in reluctances of the magnetic paths in the poles therefor to cause those main winding sections to generate current which will flow from junction 224 via junction 252, diode 242, junction 248, terminal 274, the external load, terminal 276, junction 250, diode 238, and junction 230 to those main winding sections. The current which the exciting winding 226 caused to flow through the main winding sections 222 and 220 will enable those main winding sections to develop magnetic fields; but those magnetic fields will not coact with the changes in reluctances of the magnetic paths in the poles therefor to cause those main winding sections to generate current which will flow from terminal 224 to terminal 276 because the diode 238 will prevent any such current flow.

As current flows from terminal 274 through the external load to terminal 276, some current will flow from terminal 274 via the emitter-base circuit of transistor 256, Zener diode 266, resistor 268 and ground to terminal 276, while further current will flow from terminal 274 via the emitter-collector circuit of transistor 254, junction 259, field winding section 212, junction 214, field winding section 210, and ground to terminal 276. The resulting flow of current through field winding section 212 will supply ampere turns and consequent flux lines to which the exciting winding 228 can respond. The current which that exciting winding causes to flow through the main winding sections 220 and 222 will cause the output current of the generator to increase. Similarly, the flow of current through field winding section 210 will supply ampere turns and consequent flux lines to which the exciting winding 226 can respond. The current which that exciting winding causes to flow through the main winding sections 216 and 218 will cause the output current of the generator to increase. As a result, the output current of the generator will continue to increase until the current, which flows through the emitter-base circuit of transistor 256 and Zener diode 266 and the resistor 268, makes the voltage drop across that resistor increase to the value at which SCR 270 becomes conductive. Where the generator of FIG. 5 is used to charge twelve volt batteries, the Zener diode 266 will have a twelve volt rating; and the voltage drop across resistor 268 will cause SCR 270 to become conductive, on each positive-going alternation of the A.C. voltage at junction 214, when the voltage across terminals 274 and 276 rises to about fifteen volts. As that SCR becomes conductive during each such positive-going alternation, it will apply ground voltage to junction 214, and thereby render both the field winding section 210 and the field winding section 212 essentially ineffective during those positive-going alternations. The resulting decrease in the magnetic flux lines provided by winding sections 210 and 212 will permit the voltage across the output terminals 274 and 276 to begin to decrease.

As that voltage falls to about thirteen volts, the SCR 270 will no longer become conductive during the positive-going alternations of the A.C. voltage at junction 214. The resulting increased magnetic flux lines from the winding sections 210 and 212 will enable the exciting windings 226 and 228 and the sections of the main winding to cause the voltage across output terminals to start to increase. Each time the voltage rises to about fifteen volts, the SCR 270 will become conductive and will remain conductive until that voltage falls to about thirteen volts. In this way, the output voltage is regulated to remain between about thirteen volts and fifteen volts.

If the stator of the generator of FIG. 5 were to be made with six, rather than four, poles and if the rotor were to be made with twelve, rather than eight, poles, the SCR 270 and the associated resistor 272 could be eliminated. Similarly, if the stator of the generator of FIG. 5 were to be made with ten, rather than four, poles and were made to enclose the rotor—as shown by FIG. 3, and if the rotor of FIG. 5 were to be made with five, rather than eight, poles and were made to fit within the stator—as shown by FIG. 3, the SCR 270 and the associated resistor 272 could be eliminated. The use of the six stator poles would enable two of those stator poles to be used as main-winding north poles, two more of those stator poles to be used as main-winding south poles, one of those stator poles to be used as flux path for the exciting winding 226 and field winding section 210, and the other of those stator poles to be used as flux path for the exciting winding 228 and field winding section 212. In that event, there would be a minimum amount of direct flux-line coupling between the exciting windings 226 and 228 and the sections of the halves of the main winding. Similarly, the use of the ten stator poles with the five rotor poles would enable four of those stator poles to be used as main-winding north poles, four more of those stator poles to be used as main-winding south poles, one of those stator poles to be used as flux path for the exciting winding 226 and field winding section 210, and the other of those stator poles to be used as flux path for the exciting winding 228 and field winding section 212. In that event also there would be a minimum amount of direct flux-line coupling between the exciting windings 226 and 228 and the sections of the halves of the main winding. The reduced direct flux-line coupling between those exciting windings and those sections of the halves of the main winding would be desirable, because it would permit the ratio between the rectified output current of the generator and the current supplied to the field winding to be essentially linear. More specifically, it would permit a given multiplication of the value of the current supplied to the field winding to produce a corresponding multiplication of the value of the rectified output current. Also, the reduced flux line coupling between the exciting windings and the section of the halves of the main winding is desirable, because it would permit the rectified output current to be effectively reduced to zero by a reduction of the field winding current to zero.

If the stator of generator of FIG. 5 were to be made with six poles, the two main-winding north poles would preferably be adjacent each other and the two main-winding south poles would preferably be adjacent each other. The poles for the field and exciting windings could be adjacent each other. As long as that stator was provided with two main-winding north poles and with two main-winding south poles, as long as no main-winding north pole was interposed between two main-winding south poles, as long as no main-winding south pole was interposed between two main-winding north poles, and as long as one north pole main-winding and one south pole main winding were connected to exciting winding 226 while the other north pole main winding and the other south pole main winding were connected to exciting winding 228, the poles on which those exciting windings were wound could be spaced sixty or one hundred and eighty degrees from each other in either circumferential direction and could be included in, or interposed between, any of the main-winding pole groupings.

If the stator of generator of FIG. 5 were to be made with ten poles, the four main-winding north poles would preferably be arranged as two spaced-apart two-pole groups and the four main-winding south poles would preferably be arranged as two spaced-apart two-pole groups. The poles for the field and exciting windings could be adjacent each other. As long as that stator was provided with two sets of two main-winding north poles and with two sets of two main-winding south poles, as long as no main-winding north pole was interposed between two main-winding south poles, as long as no main-winding south pole was interposed between two main-winding north poles, and as long as two north pole main-windings and two south pole main-windings were connected to exciting winding 226 while the other north pole main-windings and the other south pole main-windings were connected to exciting winding 228, the poles on which those exciting windings were wound could be spaced thirty-six, one hundred and eight or one hundred and eighty degrees from each other in either circumferential direction and could be included in, or interposed between, any of the main-winding pole groupings. If the stator of generator of FIG. 5 were to be made with six poles or ten poles, the exciting windings 226 and 228 and the field winding sections 210 and 212—which would be wound on the two poles on which those exciting windings were wound—could be wound to provide a north pole and a south pole, two north poles or two south poles. This is possible because those poles would not be relied upon to constitute parts of the magnetic paths for any section of the main winding.

Figure 10:
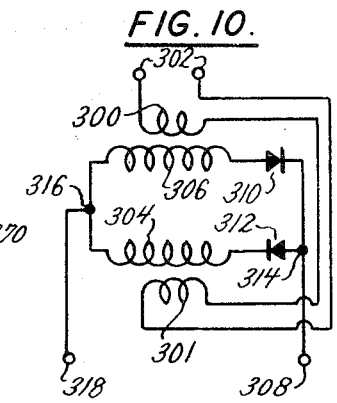
FIG. 10 is a diagram showing the windings of the embodiment of FIG. 9.
Figure 9:
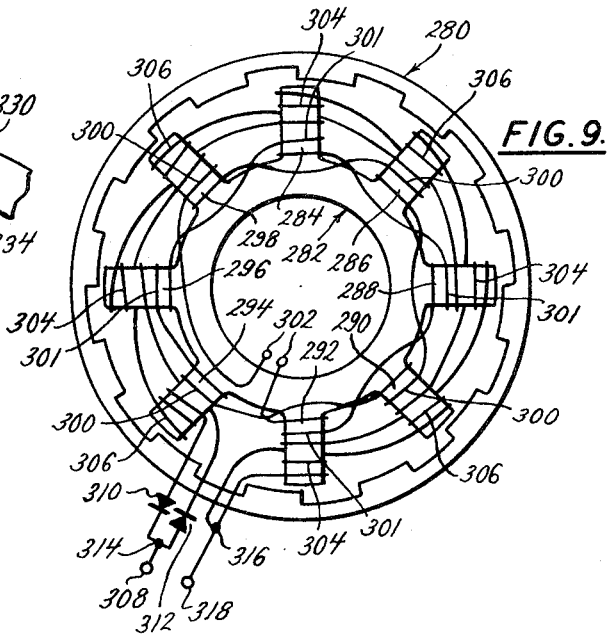
FIG. 9 is a view of a still further preferred embodiment of rotor and stator for an electric generator which is made in accordance with the principles and teachings of the present invention.

Referring particularly to FIGS. 9 and 10, the numeral 280 generally denotes the rotor of a fourth preferred embodiment of electric generator which is made in accordance with the principles and teachings of the present invention. That rotor is annular in configuration, and it is made from a number of identical, coaxial laminations of magnetic material; and each of those laminations is coated to minimize the flow of eddy currents through that rotor. Twelve (12) inwardly-extending, circumferentially-spaced poles are fromed on that rotor; and the center-to-center spacing of those poles is thirty degrees (30°). That rotor has the same configuration and dimensions as the rotor 20 of FIG. 1; and it is secured to the shaft of an engine which will supply the motive power for the electric generator. The metallic content of the laminations, the coating on those laminations, the manner of interconnecting those laminations to form the rotor 280, and the mounting of that rotor are standard and usual and are not, per se, parts of the present invention.

The numeral 282 denotes the stator for the embodiment of electric generator of FIGS. 9 and 10; it is annular in configuration, it is formed from a number of identical, coaxial laminations of magnetic material, and it has eight (8) outwardly-extending, circumferentially-spaced poles. Each of those laminations is coated to minimize the flow of eddy currents through the stator. The poles of that stator are denoted by the numerals 284, 286, 288, 290, 292, 294, 296 and 298. The ratio of the poles of the rotor 280 to the poles of the stator 282 is one and one-half to one (1.5:1). The configuration and dimensions of the stator 282 are identical to the configuration and dimensions of the stator 46 of FIG. 1.

The numeral 300 denotes one section of the field winding for the stator 282; and that field winding is wound around four (4) of the eight (8) poles of that stator so the magnetic fields in the poles 286 and 294 are of one polarity and so the magnetic fields in the poles 290 and 298 are of the opposite polarity. The numeral 301 denotes the other section of that field winding; and it is wound around the other four (4) poles of stator 282 so the magnetic fields in the poles 284 and 292 are of one polarity and so the magnetic fields in the poles 288 and 296 are of the opposite polarity. The terminals 302 of that field winding are selectively connectable to a source of direct current, not shown, by a switch, not shown. That source of direct current could be a battery; but that source is not, per se, a part of the present invention.

The numeral 304 denotes half of the main winding of the generator of FIGS. 9 and 10; and it is wound on the stator poles 284, 288, 292 and 296. That half winding is wound to provide magnetic fields of the one polarity in the poles 284 and 292 and to provide magnetic fields of the opposite polarity in the poles 288 and 296. The numeral 306 denotes the other half of the main winding; and it is wound on tator poles 286, 290, 294 and 298. That half section is wound to provide magnetic fields of the one polarity in poles 286 and 294 and to provide magnetic fields of the opposite polarity in poles 290 and 298. The numeral 308 denotes one output terminal of the generator; and a junction 314 and a diode 312 connect that terminal to one end of the half winding 304, while that junction and a diode 310 connect that terminal to one end of the half winding 306. A junction 316 connects the other ends of the half windings 304 and 306 to each other and to the other output terminal 318 of the generator.

Direct current will flow in the field winding sections 300 and 301 whenever the terminals 302 are connected to the source of direct current; and section 301 will develop magnetic fields of the one polarity in the poles 284 and 292 and will develop magnetic fields of the opposite polarity in the poles 288 and 296. The polarities of those four magnetic fields will be the same as the polarities of the magnetic fields which the half winding 304 will develop in those poles. Section 300 of the field winding will develop magnetic fields of the one polarity in the poles 286 and 294 and will develop magnetic fields of the opposite polarities in the poles 290 and 298. The polarities of those four magnetic fields will be the same as the polarities of the magnetic fields which the half winding 306 will develop in those poles. The rotor 280 will serve as parts of the paths for the magnetic fields which are developed in the various poles by the field winding sections 300 and 301; and movement of that rotor relative to the stator 282 will provide substantial variations in the reluctances of those paths. Specifically, as the rotor 280 rotates, the reluctances of the paths for the magnetic fields of the poles 286, 290, and 298 will repeatedly rise and fall to their maximum and minimum values while the reluctances of the paths for the magnetic fields of the poles 284, 288, 292 and 296 repeatedly fall and rise to their minimum and maximum values.

During part of each revolution of the rotor 280, the axes of four rotor poles will be in register with the axes of the stator poles 284, 288, 292 and 296 while the axes of the remianing rotor poles will be out of register with the axes of all of the stator poles. During another part of that revolution, the axes of four rotor poles will be in register with the axes of the stator poles 286, 290, 294 and 298 while the axes of the remaining rotor poles will be out of register with the axes of all of the stator poles.

When the reluctances of the paths for the magnetic fields, that are generated by the portions of field winding 300 which are wound on the stator poles 284, 288, 292 and 296, are minimal large numbers of flux lines will pass through the half winding 304. Conversely, when the reluctances of those paths are maximal, far fewer flux lines will pass through that half winding. When the reluctances of the paths for the magnetic fields, that are generated by the portions of field winding 300 which are wound on the stator poles 286, 290, 294 and 298, are minimal large numbers of flux lines will pass through the half winding 306. Conversely, when the reluctances of those paths are maximal, far fewer flux lines will pass through that half winding.

As rotor poles, which are in register with the stator poles 284, 288, 292 and 296, respond to rotation of rotor 280 to start moving away from those stator poles, the reluctances of the magnetic paths through those stator poles will begin to increase; and hence the inductance of half winding 304 will begin to decrease. Thereupon, current will begin to flow through that half winding, junction 316, terminal 318, an external load, not shown, terminal 308, junction 314 and diode 312. No current will be able to flow from junction 314 to terminal 318 via the half winding 306 because the diode 310 will prevent such flow. Subsequently, as rotor poles, which are in register with the stator poles 286, 290, 294 and 298, respond to rotation of rotor 280 to start moving away from those stator poles, the reluctances of the magnetic paths through those stator poles will begin to increase; and hence the inductance of half winding 306 will begin to decrease. Thereupon, current will begin to flow through that half winding diode 310, junction 314, terminal 308, the external load, and terminal 318 to junction 316. No current will be able to flow from junction 316 to terminal 308 via the half winding 304 because the diode 312 will prevent such flow.

The electric generator of FIGS. 9 and 10 differs from the electric generators of FIGS. 1 and 2 and of FIGS. 3 and 4 in having the field winding 300, 301 wound onto all, rather than just a few, of the stator poles. Also that generator differs from the electric generators of FIGS. 1 and 2 and of FIGS. 3 and 4 in not having exciting windings. Although the generator of FIGS. 9 and 10 will not have the extremely-low ampere turns of the generators of FIGS. 1 and 2 and of FIGS. 3 and 4—because it does not have an exciting winding in addition to the field winding 300, 301—it will have a lower-than-normal number of ampere turns; because the diodes 310 and 312 will permit A.C. current flow only as the rotor poles move away from the stator poles, and also will make certain that the A.C. current flow is in the same direction as the field winding current flow.

The electric generator of FIGS. 9 and 10 has the field winding sections 300 and 301 thereof wound, and has the diodes 310 and 312 thereof oriented, to enable that generator to provide an A.C. output. Specifically, the field winding section 300 is wound so the connecting of the positive terminal of a D.C. source to the left-hand field winding terminal 302 will cause current to flow through that field winding section in the same direction in which current will flow through main winding section 306 and diode 310. Also, the field winding section 301 is wound so the connecting of the positive terminal of that D.C. source to that left-hand field winding terminal will cause current to flow through that field winding section in the same direction in which current will flow through diode 312 and main winding section 304. The current flow through main winding section 306 will provide one-half of the A.C., and the current flow through the main winding section 304 will provide the other half of the A.C.

If desired, the electric generator of FIGS. 9 and 10 could be arranged to provide D.C. of a desired polarity. To accomplish that result, the position of the diode 312 would be reversed so the anode of that diode would be connected to the right-hand terminal of the main winding section 304 and so the cathode of that diode would be connected to the junction 314; and the field winding section 301 would have the left-hand terminal thereof connected to the right-hand terminal of the field winding section 300, and the right-hand terminal of the field winding section 301 would be connected to the right-hand field winding terminal 302. Where that was done, the connecting of the positive terminal of the D.C. source to the left-hand field winding terminal 302 would cause current in the field winding section 300 and in the field winding section 301 to flow from left to right; and the diodes 310 and 312 would cause the current in the main winding sections 306 and 304 to flow from left to right. The series-connected main winding section 306 and diode 310 would provide one-half of a full-wave rectified D.C., and the series-connected main winding section 304 and diode 312 would provide the other half of that full-wave rectified D.C.

Further, if desired, the electric generator of FIGS. 9 and 10 could be arranged to provide D.C. of the opposite polarity. To accomplish that result, the diode 312 would be connected as shown by FIGS. 9 and 10, the position of the diode 310 would be reversed so the cathode of that diode was connected to the right-hand terminal of the main winding section 306 and so the anode of that diode was connected to the junction 314; and the left-hand field winding terminal 302 would be connected to the right-hand terminal of field winding section 300, the left-hand terminal of that field winding section would be connected to the right-hand terminal of the field winding section 301, and the left-hand terminal of the latter field winding section would be connected to the right-hand field winding terminal 302. Where that was done, the connecting of the positive terminal of the D.C. source to the left-hand field winding terminal 302 would cause current in the field winding section 300 and in the field winding section 301 to flow from right to left; and the diodes 301 and 312 would cause the current in the main winding sections 306 and 304 to flow from right to left. The series-connected main winding section 306 and diode 310 would provide one-half of a full-wave rectified D.C., and the series-connected main winding section 304 and diode 312 would provide the other half of that full-wave rectified D.C. The polarity of that full-wave rectified D.C. would be opposite to the polarity of the full-wave rectified D.C. which the generator of FIGS. 9 and 10 would provide if the current flowed from left to right in all of the winding sections 300, 301, 304 and 306.

The forming of field winding 300, 301 as two sections is desirable; because it will enable a manufacturer of the generator of FIGS. 9 and 10 to use the same winding machines and techniques in winding that generator—whether that generator is to be used to generate A.C., D.C. of one polarity, or D.C. of the opposite polarity. All that manufacturer would have to do would be to appropriately connect the sections 300 and 301 and to appropriately orient the diodes 310 and 312, all as described hereinbefore. If, however, a manufacturer wished to use the generator to provide only A.C., or to provide only D.C. of one polarity, or to provide only D.C. of the opposite polarity, that manufacturer could wind the field winding 300, 301 as one continuous winding. In doing so, that manufacturer would wind that field winding onto the various poles of the stator in such a way that the current flowing through the portion of the field winding on any given pole would be in the same direction as the current flowing through the portion of the main winding which was wound on that pole.

If desired, the electric generator of FIGS. 3 and 4 could be arranged to provide only A.C.; as by removing the diodes 176, 184, 186 and 190, by removing the junction 182, and by removing the output terminals 168 and 170. Alternatively, that electric generator could be arranged to provide only D.C., as by eliminating the diodes 192 and 204, by eliminating the junction 194, and by eliminating the output terminals 172 and 174.

FIGS. 1–5 show how the principles and teachings of the present invention are incorporated into electric generators which are equipped with exciting windings as well as field windings. FIGS. 9 and 10 show how the principles and teachings of the present invention can be incorporated into an electric generator which has a field winding but which does not have exciting windings. If desired, the principles and teachings of the present invention could be incorporated into an electric generator which did not have an actual field winding or actual exciting windings and, instead, had the main winding thereof perform the dual functions of field and main windings. Specifically, if desired, the electric generator of FIGS. 3 and 4 could be modified by the removal of field winding 140 and its terminals 142, by the removal of exciting windings 164 and 166 and their diodes 196 and 202, by the removal of junctions 198 and 202, and by the connecting of the positive and negative terminals, respectively, of a D.C. source to the junctions 178 and 188. That D.C. source would then provide the uni-directional current flow through the sections 144, 146, 148, 150, 152, 162, 160, 158, 156 and 154 of the main winding which the field winding 140 normally enables the exciting windings 164 and 166 of FIG. 4 to provide.

The reluctances of the resulting magnetic fields in the poles 136, 134, 132, 130, 128, 126, 124, 122, 120 and 118 would experience sharp changes as the rotor 100 rotated; and the sections of the main winding would then respond to the resulting changes in flux line flow to generate output current. In the modified generator of FIGS. 3 and 4, the diodes would permit output current to flow in the main winding only as the rotor poles separated from the stator poles; and hence the magnetomotive force which was generated by current from the D.C. source would not have to overcome the magnetomotive force which was generated in the main winding by the output current. As a result, the D.C. source could supply less current than would be needed if the magnetomotive force which was generated by the current from that source had to overcome the magnetomotive force which was generated in the main winding by the output current.

The electric generators which are shown in the drawing are provided with shunt field windings. If desired, those generators could be provided with series field windings as well as shunt field windings, and hence would become compound-wound generators. Those series field windings could be connected so they were cumulative series windings, or they could be connected so they were differential series windings. As a result, the electric generators of the present invention can be made to provide all of the electrical characteristics which can be provided by most prior electric generators; and, in addition, can avoid the need of having the magnetomotive force, which is generated by the D.C. source, overcome the magnetomotive force which is generated by the main winding as the rotor poles approach the stator poles.

Figure 6:
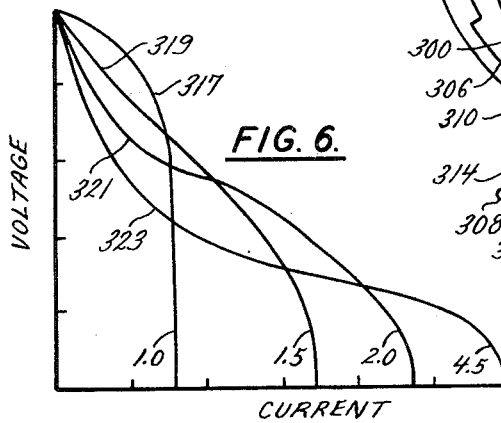
FIG. 6 shows various volt-ampere curves for the rectified outputs of generators which are made in accordance with the principles and teachings of the present invention; and those curves indicate how the volt-ampere relationship varies with the ratios of rotor pole widths to stator pole widths.

Referring particularly to FIG. 6, the numeral 317 denotes a curve which shows how rectified output voltage changes as rectified output current changes when the ratio of rotor pole widths to stator pole widths is one (1); and the numeral 319 denotes a curve which shows how rectified output voltage changes as rectified output current changes when the ratio of rotor pole widths to stator pole widths is one and one-half (1½). The numeral 321 denotes a curve which shows how rectified output voltage changes as rectified output current changes when the ratio of rotor pole widths to stator pole widths is two (2); and the numeral 323 denotes a curve which shows how rectified output voltage changes as rectified output current changes when the ratio of rotor pole widths to stator pole widths is four and one-half (4½). The curve 317 approximates a constant current curve; and the curve 323 roughly approximates a constant voltage curve. As a result, FIG. 7 indicates that by proper selection of the ratio of rotor pole widths to stator pole widths, a manufacturer of electric generators can provide almost any desired rectified volt-ampere characteristic between a nearly-constant curve and a roughly-constant voltage curve. This means that generators provided by the present invention are far more flexible and adaptable than are prior generators. It is important to note that by providing a ratio of rotor pole widths to stator pole widths of two (2) or more, it is possible to provide a rectified volt-ampere curve that clearly is not a constant current curve and that roughly approximates a constant voltage curve.

Figure 7:
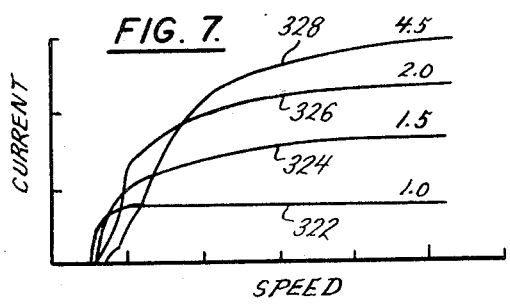
FIG. 7 shows current-speed curves for the rectified outputs of generators which are made in accordance with the principles and teachings of the present invention; and those curves indicate how the current-speed characteristic varies with the ratios of rotor pole widths to stator widths.

FIG. 7 shows how changes in the ratio of rotor pole widths to stator pole widths can affect the rectified current-to-speed ratio of the generator output. The numeral 322 denotes a curve which indicates how increases in rotor speed increase the rectified output current when the ratio of rotor pole widths to stator pole widths is one (1); and the numeral 324 denotes a curve which indicates how increases in rotor speed increase the rectified output current when the ratio of rotor pole widths to stator pole widths ie one and one-half (1½). The numeral 326 denotes a curve which indicates how increases in rotor speed increase the rectified output current when the ratio of rotor pole widths to stator pole widths is two (2); and the numeral 328 denotes a curve which indicates how increases in rotor speed increase the rectified output current when the ratio of rotor pole widths to stator pole widths is four and one-half (4½). By providing a ratio of rotor pole widths to stator pole widths of one and one-half (1½) or greater, the present invention provides higher-than-normal rectified output currents for any selected rotor speed. Although the ratio of rotor pole widths to stator pole widths of one and one-half (1½) or greater is very useful in generators provided by the present invention, such a ratio would also be useful in other generators.

As indicated hereinbefore, the curves of FIG. 8 indicate that changes in the ratio of maximum inductance to minimum inductance change the ratio of rectified output current to exciting current for any given ratios of rotor pole widths to stator pole widths. Those curves also show that the generators provided by the present invention have inherent current-limiting characteristics; and those characteristics can be used to advantage in some applications. In addition, the curves of FIG. 8 show that by providing a ratio of rotor pole widths to stator pole widths of two (2) or more, it is possible to provide ratios of rectified output current to exciting current which are greater than two (2) even where the ratio of maximum inductance to minimum inductance is less than ten (10). In providing desirable ratios of maximum inductance to minimum inductance, the ratio of rotor pole widths to stator pole widths must be greater than one (1); because it would be extremely difficult to attain a ratio of maximum inductance to minimum inductance which was greater than ten (10) unless the ratio of rotor pole widths to stator pole widths was greater than one (1).

As indicated hereinbefore, the halves of the main winding of the generator of FIGS. 1 and 2 could be connected in series rather than in parallel. Also, that generator could have the exciting windings 68 and 72 thereof connected intermediate some of those series-connected windings. For example, one end of section 67 could be connected to junction 75, the other end of that section could be connected to one end of section 65, the other end of section 65 could be parallel-connected to the cathode of diode 82 and to one end of exciting winding 68, the diode 74 could have its cathode connected to the other end of exciting winding 68 and have its anode connected to the anode of diode 82 and also to one end of section 69, and the other end of the latter section could be connected to junction 81. Similarly, the section 61 could have one end connected to junction 75 and have its other end connected to one end of section 59, the other end of section 59 could be parallel-connected to the anode of diode 78 and to one end of the exciting winding 72, the other end of that exciting winding could be connected to the anode of diode 70, the cathode of that diode could be connected to one end of section 63 and also to the cathode of diode 78, and the other end of section 63 could be connected to junction 81.

Various other changes could be made in the connections of the windings of the generator of FIGS. 1 and 2 and in the connections of the windings of the generators of the other views. However, any such changes must permit the diodes to continue to cause the current flows in the main windings to be such that the magnetic fields of the field winding do not have to overcome them.

The frequencies of the output voltages of generators which are provided by the present invention are twice the output frequencies of conventional alternators which have the same number of rotor poles and which operate at the same speeds as those generators but which are equipped with slip rings. Because the generators of the present invention do not require windings on the rotors thereof—and hence can have the rotors thereof driven at extremely high speeds—the generators of the present invention can develop many times the kilowatts per pound ratios of conventional alternators which use wound rotors. Also the generators of the present invention are lighter than D.C. generators of equivalent kilowatt ratings and speeds.

The ratios of maximum to minimum inductance—which are represented by the curves 95, 97, 98 and 99 in FIG. 8—can be changed by filling all or parts of the air spaces within the rotors with conductors of copper, aluminum or other good conductive metals. Those conductors could take the form of shorted rings or turns which were mounted within conventional rotor slots. Alternatively, those conductors could take the form of bars of metal which were used to fill the spaces between the poles on the rotors shown in the drawing. The conductors would, in either instance, retard the flow of magnetic flux lines, and hence increase the reluctance of the rotor poles with which they were associated. As a result, those conductors would have an effect on inductance which would be comparable to the effect that would be produced by increasing the air gaps between the confronting faces of the rotor and stator poles.

Where the electric generators of the present invention are provided with high ratios of rotor pole widths to stator pole widths, as for example ratios of at least three to one (3:1), high percentages of third harmonics will be generated. Under heavy load conditions, the inductive drops in the main winding sections will cause the output voltages to generally resemble square waves. However, under lighter load conditions, the voltage peaks of the third harmonics can add to the peak voltages of the fundamental frequency to provide summation peak voltages which are considerably higher than the peak voltages of that fundamental frequency. This is desirable where the electric generators of the present invention are used to charge batteries; because those summation peak voltages, which are due to the those third harmonics, enable the generators to attain battery-charging voltage output levels at speeds which are lower than the speeds which would be required if those generators produced pure sine wave output voltages. Also, if desired, generators which supply high percentages of third harmonic voltages in their outputs could be used to supply signals to frequency multiplication circuits.

In any installations where high percentages of third harmonic voltages would be objectionable in the generator outputs, the present invention makes it possible to minimize those third harmonic voltages by merely reducing the ratio of rotor pole widths to stator pole widths. Specifically, by making the ratio of rotor pole widths to stator pole widths one and one-half ($1\frac{1}{2}$) or smaller, the third harmonic voltages in the generator output can be minimized.

In each of FIGS. 1–5, the field winding, the exciting windings and the main winding sections are wound on poles of the same stator; and it is preferred that those windings and those sections be so wound. If desired, however, the field winding and the exciting windings could be wound on one stator and the main winding sections could be wound on another stator—as long as both stators rotated together and had the same number of poles and as long as the rotor poles interacted with the poles of both stators.

In each of FIGS. 1–5, the main winding sections were wound so no turns of any of those sections were on a pole which had turns of an exciting winding on it. This is desirable; because it minimizes the effect which the A.C., that is generated by those main winding sections, can have on the D.C. generated by the exciting winding. In some instances where appreciable amounts of coupling between the A.C. from the main windings and the D.C. from the exciting winding can be tolerated—as where full field winding current is desired—some turns of a main winding can be wound on a pole which has turns of an exciting winding on it. However, in most generators that are made in accordance with the principles and teachings of FIGS. 1–5 of the present invention, it will be desirable to wind the exciting winding on poles that have no turns of the main winding on them.

In each of FIGS. 1–4, the exciting windings are wound on two of the stator poles. If desired, however, those exciting windings could be wound on four stator poles; and, in that event, one of those windings would have two sections that were connected in series on alternate stator poles, and the other of those windings would have two sections that were connected in series on the intervening stator poles. Such an arrangement is not the preferred arrangement, because it would require some turns of the exciting windings to be wound on poles which bear turns of the main windings.

In the event an electric generator were to be made with twenty (20) stator poles—as where a very high output frequency or a very slow speed was desired—the exciting windings and the field windings could be wound on four stator poles and the sections of the main winding could be wound on the other sixteen (16) stator poles. One of the exciting windings would be wound on two (2) of the four (4) stator poles, and it would be wound to supply D.C. exciting current to the sections of the main winding during one half of the time. The other of the exciting windings would be wound on the other two (2) of the four (4) stator poles, and it would be wound to supply D.C. exciting current to the sections of the main winding during the other half of the time. One half of the main winding would be wound on eight (8) of the other sixteen (16) stator poles, and it would provide the positive alternations of the A.C.; and the other half of the main winding would be wound on the other eight (8) of those sixteen (16) stator poles, and it would provide the negative alternations of the A.C.

In the event an electric generator were to be made with just four (4) stator poles—as shown by FIG. 5—some turns of the field winding, all of the turns of one of the exciting windings, and some turns of one-half of the main winding would be wound on one (1) of those four (4) poles. The remaining turns of that field winding, all of the turns of the other of the exciting windings, and some turns of the other half of the main winding would be wound on a second of those four (4) poles. The rest of the one-half of the main winding would be wound on a third of those four (4) poles; and the rest of the other half of the main winding would be wound on the fourth of those four (4) poles.

In each of FIGS. 1–4, the exciting windings are wound from wire of one size and the sections of the main winding are wound from wire of a different size; and that is desirable because the values of current flowing through the main winding are larger than the values of current flowing through the exciting windings. However, if desired, the exciting windings could be wound from the same size wire that is used to wind the sections of the main windings. In the latter event, the junctions 77 and 79 in FIGS. 1 and 2 and the junctions 198 and 200 in FIGS. 3 and 4 could be taps rather than junctions.

The fact that the preferred embodiments of the present invention do not require windings on the rotors thereof enables those rotors to be rotated at very high speeds. As a result, those preferred embodiments can be driven by engines—such as turbo engines—at speeds up to one hundred thousand revolutions per minute (100,000 R.P.M.). If one of the generators of the present invention were driven at one hundred thousand revolutions per minute (100,000 R.P.M.), it could provide a pound-to-horsepower ratio as low as one-to-one (1:1). In contrast, a conventional wound-rotor alternator which was driven at thirty-six hundred revolutions per minute (3600 R.P.M.) would require a pound-to-horsepower ratio as high as ten-to-one (10:1).

In FIGS. 1 and 2 and 9 and 10, the number of stator poles was two-thirds ($\frac{2}{3}$) the number of rotor poles. If desired, the generators of those views could have been provided with stators which had two (2) times the number of rotor poles. This means that where a single phase generator is made in accordance with the principles and teachings of the present invention, the number of rotor poles can be denoted as n (a positive integer) and the number of stator poles will then be $\frac{2}{3}$ n or 2 n. If such a generator were to be wound to provide four phase A.C.—instead of the single phase A.C. provided by the generators of the drawing—the number of rotor poles would be denoted as 3 n (n being a positive integer) and the number of stator poles would be 4 n or 12 n. If such a generator were to be wound to provide six phase A.C.—instead of the single phase A.C. provided by the generators of the drawing—the number of rotor poles would be denoted as 5 n (n being a positive integer) and the number of stator poles would be 6 n or 30 n.

In FIGS. 3 and 4, the number of rotor poles was one-half the number of stator poles. This means that where a generator is made in accordance with the principles and teachings of the present invention and the number of rotor poles can be denoted as n (a positive integer), the number of stator poles will be 2 n or $\frac{2}{3}$ n. If such a generator were to be wound to provide four phase A.C.—instead of the single phase A.C. provided by the generators of the drawing—the number of stator poles would be 4 n or 4/3 n. If such a generator were to be wound to provide six phase A.C.—instead of the single phase A.C. provided by the generators of the drawing—the number of stator poles would be 6 n or 6/5 n.

A prior art induction generator must have a number of ampere turns in the field winding thereof which is greater than the number of ampere turns in the main winding thereof. However, as indicated hereinbefore, the field winding of the generator of FIGS. 9 and 10 can have a lower-than-normal number of ampere turns—being able to have a number of ampere turns which is smaller than the number of ampere turns in the main winding thereof. This is due to the fact that the magnetic field generated by the field winding will not have to overcome the magnetic fields generated by any of the sections of the main winding. The field windings of the generators of FIGS. 1–5 can have even lower numbers of ampere turns in the field windings thereof—being able to have numbers of ampere turns which are much smaller than the numbers of ampere turns in the main windings thereof. This is due to the fact that the magnetic fields generated by those field windings will not have to overcome the magnetic fields generated by any of the sections of the main winding and also because the exciting windings provide a desirable power amplification. For example, where a generator has exciting windings in addition to field windings, the number of ampere turns in the field winding can be as small as one-fifteenth (1/15) of the number of ampere turns in the main winding. Specifically, the flow of one (1) ampere through the four hundred and forty (440) turn field winding 64 of the generator of FIG. 1 causes ten (10) amperes of D.C. to flow through the two hundred and sixty-four (264) turn two-section exciting winding 68,72; and those ten (10) amperes cause twenty-five (25) amperes of A.C. to flow through the two hundred and sixty-four (264) turn six-section main winding 59, 61, 63, 65, 67 and 69. This means that four hundred and forty (440) ampere turns in the field winding 64 can produce sixty-six hundred (6600) ampere turns in the main winding 59, 61, 63, 65, 67 and 69.

The field winding of the generator of FIGS. 9 and 10 requires fewer ampere-turns than does the field winding of an induction generator (hereinafter prior art generator) which resembles it in having a wound stator and a winding-free rotor which encircles that stator; but the field winding of the generator of FIGS. 1 and 2 requires even fewer ampere-turns than does the field winding of the generator of FIGS. 9 and 10. Specifically, the ampere-turns for the field windings of a four hundred and twenty-five ampere (425 A.) forty-volt (40 V) arc welding generator which had the rotor thereof driven at fifty-five hundred revolutions per minute (5500 R.P.M.) would have the following values:

| FIGS. 1 and 2 Generator | FIGS. 9 and 10 Generator | Prior Art Generator |
|---|---|---|
| 582 | 2910 | 8010 |

If a generator, which is made in accordance with the principles and teachings of the present invention, is to be operated at slow speed, it can be made with a stator that has a relatively-large number of poles—as for example eight or more poles. In such event, it will be desirable to provide that stator with enough poles to provide four, eight, sixteen or more north-south pole groups for the main winding and to provide at least two poles on which the exciting windings could be wound. Such an arrangement would minimize the A.C. coupling between the exciting windings and the main winding. However where a generator, which is made in accordance with the principles and teachings of the present invention, is to be operated at high speeds, only a relatively-small number of poles should be provided on the stator—to hold down the frequency of the output voltage. In such event, the exciting windings will have to be wound on poles which constitute parts of some north-south flux paths that include poles on which sections of the main winding are wound. However, in all instances, the stators will be wound so each south pole will be interposed between a north pole and another south pole and so each north pole will be interposed between a south pole and another north pole.

Figure 11:
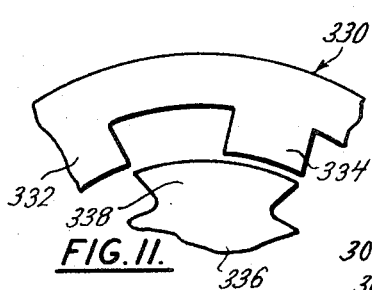
FIG. 11 is a view showing part of a stator and part of a rotor for yet another preferred form of generator which is made in accordance with the principles and teachings of the present invention.

In FIGS. 1 and 10 the rotors are shown encircling the stators, whereas in FIGS. 3 and 11 the stators are shown encircling the rotors. In each instance, the circumferential dimensions of the faces (widths) of the poles of the rotor are larger than the circumferential dimensions of the faces (widths) of the poles of the stator.

Referring particularly to FIG. 11, the numeral 330 generally denotes part of a stator of yet another preferred embodiment of generator which is made in accordance with the principles and teachings of the present invention. The outer diameter of that stator is eight and five hundred and thirty-six thousandths (8.536) inches, the diametric spacing between the stator pole faces is five and seven hundred and eighty-six thousandths (5.786) inches, the height of each stator pole is seventy-five hundredths (0.75) of an inch, and the width of each stator pole is one and one thousand two hundred and eighty-eight ten-thousandths (1.1288) inches. There are eight poles on the stator 330; and FIG. 11 shows one full pole 334 and part of another pole 332. The numeral 336 generally denotes part of the rotor which is used with the stator 330; and the diametric distance between the faces of the rotor poles is five and seventy-five hundredths (5.75) inches, the height of each rotor pole is six hundred and twenty-five thousandths (0.625) of an inch, and the width of each rotor pole is two and two thousand and four ten-thousandths (2.2004) inches. There are four rotor poles; and FIG. 11 shows one full pole 338. The sides of the pole 338, and the sides of the other three rotor poles, are defined by lines which converge inwardly toward the geometric center of that rotor. In the embodiment shown by FIG. 11, the edges of the pole 338 coact with tangents to the face of that pole to subtend angles of about sixty-eight degrees.

The resulting undercutting of the pole 338 and of the other three rotor poles enables the generator of FIG. 11 to have a ratio, between the rotor pole widths and the stator pole widths, of two and yet have an acceptably low level of flux line leakage from the sides of those rotor poles. Consequently, undercut rotor poles make it possible to provide desirably-large ratios of rotor pole widths to stator pole widths while limiting flux leakage from the side of those rotor poles. Undercut poles are particularly useful on rotors which have four poles.

The windings of the various preferred embodiments of generator are wound on the stators to obviate any need of brushes, slip rings or commutators. However, if desired, the windings could be mounted on the rotors. Whether the windings are wound on a stationary member or on a rotatable member, a desirable reduction in the number of ampere turns in the field winding will be attained by the limiting of current flow through each section of the main winding to those portions of each revolution of the rotatable member wherein the poles, of the member on which that section is wound, are being separated from adjacent poles of the other member. Also, whether the windings are wound on a stationary member or on a rotatable member, a further desirable reduction in the number of ampere turns in the field winding will be attained by the provision of exciting windings in addition to the field windings.

Whereas the drawing and accompanying description have shown and described several preferred embodiments of the present invention, it should be apparent to those skilled in the art that various changes may be made in the form of the invention without affecting the scope thereof.

What I claim is:

1. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member.

2. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, the reluctance of said one pole reaching its minimum value at a position, during said relative movement between said poles on said members, which is displaced from the position during said relative movement between said poles on said members wherein the reluctance of said one further pole reaches its minimum value.

3. An electric generator as claimed in claim 1 wherein the number of poles on said stationary member differs from the number of poles on said rotatable member.

4. An electric generator as claimed in claim 1 wherein said stationary member encircles said rotatable member, and wherein the number of poles on said stationary member is greater than the number of poles on said rotatable member.

5. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, said stationary member encircling said rotatable member, the number of poles on said stationary member being greater than the number of poles on said rotatable member, and the circumferential dimensions of the faces of the poles on said rotatable member being larger than the circumferential dimensions of the faces of the poles on said stationary member.

6. An electric generator as claimed in claim 1 wherein said stationary member encircles said rotatable member, and wherein the circumferential dimensions of the faces of the poles on said rotatable member are larger than the circumferential dimensions of the faces of the poles on said stationary member.

7. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, said rotatable member encircling said stationary member, and the number of poles on said rotatable member being greater than the number of poles on said stationary member.

8. An electric generator as claimed in claim 1 wherein said rotatable member encircles said stationary member, wherein the number of poles on said rotatable member is greater than the number of poles on said stationary member, and wherein the circumferential dimensions of the faces of the poles on said rotatable member are larger than the circumferential dimensions of the faces of the poles on said stationary member.

9. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, said rotatable member encircling said stationary member, and the circumferential dimensions of the faces of the poles on said rotatable member being larger than the circumferential dimensions of the faces of the poles on said stationary member.

10. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, a field winding that is wound on at least two poles of said one member, and the number of ampere turns of said field winding being less than the number of ampere turns of said main winding.

11. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, exciting windings that are wound on at least two poles of said one member, and the sum of the number of ampere turns of said exciting windings being less than the number of ampere turns of said main winding.

12. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, a field winding that is wound on at least two poles of said one member, exciting windings that are wound on said two poles of said one member to be excited by the magnetic fields from said field winding, the number of ampere turns of said field winding being less than the number of ampere turns of said main winding, and the sum of the number of ampere turns of said exciting windings being less than the number of ampere turns of said main winding.

13. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, exciting windings that are wound on at least two poles of said one member, one of said exciting windings being connected in series relation with said one section of said main winding, and the other of said exciting windings being connected in series relation with said further section of said main winding.

14. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, exciting windings that are wound on at least two poles of said one member, one of said exciting windings being connected in series relation with said one section of said main winding, the other of said exciting windings being connected in series relation with said further section of said main winding, and said exciting windings causing a uni-directional current to flow through said one and said further sections of said main winding.

15. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, one terminal of said one section of said main winding being connected to one terminal of said further section of said main winding, exciting windings that are wound on at least two poles of said one member, a further uni-directional means and one of said exciting windings being connected in series relation to a further terminal of said one section of said main winding to cause uni-directional current to flow through said one and said further sections of said main winding during at least one part of each revolution of said rotatable member, and another uni-directional means and another of said exciting windings being connected in series relation to a further terminal of said further section of said main winding to cause uni-directional current to flow through said one and said further sections of said main winding during a different part of each revolution of said rotatable member.

16. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, said one section of said main winding developing at least one north pole and at least one south pole, said other section of said main winding developing at least one north pole and at least one south pole, each north pole being interposed between a south pole and another north pole, and each south pole being interposed between a north pole and another south pole.

17. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, said one section of said main winding developing at least one north pole and at least one south pole, said other section of said main winding developing at least one north pole and at least one south pole, a field winding that is wound on at least two poles of said one member, said field winding developing at least one north pole and at least one south pole, no north pole developed by said main winding opposing a north pole developed by said field winding, and no south pole developed by said main winding opposing a south pole developed by said field winding.

18. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, a field winding that generates a magnetic field, an exciting winding that is adjacent said field winding and that is connected to said main winding, said exciting winding responding to said magnetic field generated by said field winding and to the rotation of said rotatable member relative to said stationary member to cause exciting current to flow in said main winding, said main winding responding to said exciting current from said exciting winding and to said rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member.

19. An electric generator as claimed in claim 18 wherein said exciting current in said exciting winding has a larger value than the current in said field winding, and wherein said output current in said main winding has a larger value than said exciting current in said exciting winding.

20. An electric generator as claimed in claim 18 wherein said field winding is wound on at least two of the poles of said one member, and wherein turns of said exciting winding are wound on said two poles of said one member.

21. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which is wound on at least some of the poles of one of said members, a field winding that generates a magnetic field, an exciting winding that is adjacent said field winding and that is connected to said main winding, said exciting winding responding to said magnetic field generated by said field winding and to the rotation of said rotatable member relative to said stationary member to cause exciting current to flow in said main winding, said main winding responding to said exciting current from said exciting winding and to said rotation of said rotatable member relative to said stationary member to develop an output current, said main winding being divided into a plurality of sections, polarizing means associated with at least one of said sections of said main winding permitting output current to flow in one direction through said one of said sections, and further polarizing means associated with another of said sections of said main winding permitting output current to flow through said other of said sections in the opposite direction.

22. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which is wound on at least some of the poles of one of said members, a field winding that generates a magnetic field, an exciting winding that is adjacent said field winding and that is connected to said main winding, said exciting winding responding to said magnetic field generated by said field winding and to the rotation of said rotatable member relative to said stationary member to cause exciting current to flow in said main winding, said main winding responding to said exciting current from said exciting winding and to said rotation of said rotatable member relative to said stationary member to develop an output current, said main winding being divided into a plurality of sections, a uni-directional means connected in series with at least one of said sections of said main winding to permit output current to flow in one direction through said one of said sections while preventing flow of output current in the opposite direction through said one of said sections, and a further uni-directional means connected in series with said other of said sections of said main winding to permit output current to flow in a given direction through said other of said sections while preventing flow of output current in the opposed direction through said other of said sections.

23. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which is wound on at least some of the poles of one of said members, a field winding that generates a magnetic field, and exciting winding that is adjacent said field winding and that is connected to said main winding, said exciting winding responding to said magnetic field generated by said field winding and to the rotation of said rotatable member relative to said stationary member to cause exciting current to flow in said main winding, said main winding responding to said exciting current from said exciting winding and to said rotation of said rotatable member relative to said stationary member to develop an output current, and a uni-directional means connected in series with said exciting winding to enable said exciting winding to cause uni-directional current flow through said main winding.

24. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which is wound on at least some of the poles of one of said members, a field winding that generates a magnetic field, an exciting winding that is adjacent said field winding and that is connected to said main winding, said exciting winding responding to said magnetic field generated by said field winding and to the rotation of said rotatable member relative to said stationary member to cause exciting current to flow in said main winding, said main winding responding to said exciting current from said exciting winding and to said rotation of said rotatable member relative to said stationary member to develop an output current, said main winding being divided into a plurality of sections, a uni-directional means connected in series with at least one of said sections of said main winding to permit output current to flow in one direction through said one of said sections while preventing flow of output current in the opposite direction through said one of said sections, a further uni-directional means connected in series with another of said sections of said main winding to permit output current to flow in a given direction through said other of said sections while preventing flow of output current in the opposed direction through said other of said sections, and another uni-directional means connected in series with said exciting winding to enable said exciting winding to cause uni-directional current flow through at least part of said main winding.

25. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which is wound on at least some of the poles of one of said members, a field winding that generates a magnetic field, an exciting winding that is adjacent said field winding and that is connected to said main winding, said exciting winding responding to said magnetic field generated by said field winding and to the rotation of said rotatable member relative to said stationary member to cause exciting current to flow in said main winding, said main winding responding to said exciting current from said exciting winding and to said rotation of said rotatable member relative to said stationary member to develop an output current, said main winding being divided into a plurality of sections, a unidirectional means connected in series with at least one of said sections of said main winding to permit output current to flow in one direction through said one of said sections while preventing flow of output current in the opposite direction through said one of said sections, a further unidirectional means connected in series with another of said sections of said main winding to permit output current to flow in a given direction through said other of said sections while preventing flow of output current in the opposed direction through said other of said sections, said exciting winding having a plurality of sections, another unidirectional means connected in series with said one section of said main winding and with one section of said exciting winding to enable said one section of said exciting winding to cause unidirectional current flow through said one section of said main winding, and yet another unidirectional means connected in series with said other section of said main winding and with another section of said exciting winding to enable said other section of said exciting winding to cause unidirectional current flow through said other section of said main winding.

26. An electric generator as claimed in claim 18 wherein a control circuit normally causes a portion of said output current to flow through at least a part of said field winding, and wherein a means within said control circuit can cause said control circuit to reduce the flow of said output current through said part of said field winding when the output voltage of said electric generator reaches a predetermined value.

27. An electric generator as claimed in claim 18 wherein said main winding has a plurality of sections, wherein said exciting winding has a plurality of sections, wherein one section of said exciting winding is connected in series with one section of said main winding, and wherein another section of said exciting winding is connected in series with another section of said main winding.

28. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which is wound on at least some of the poles of one of said members, a field winding that generates a magnetic field, an exciting winding that is adjacent said field winding and that is connected to said main winding, said exciting winding responding to said magnetic field generated by said field winding and to the rotation of said rotatable member relative to said stationary member to cause exciting current to flow in said main winding, said main winding responding to said exciting current from said exciting winding and to said rotation of said rotatable member relative to said stationary member to develop an output current, said main winding having a plurality of sections, said exciting winding having a plurality of sections, one section of said exciting winding being connected in series with one section of said main winding, another section of said exciting winding being connected in series with another section of said main winding, means that enable said one section of said exciting winding to cause current flow through said one section of said main winding while keeping said other section of said exciting winding from causing current flow through said other section of said main winding during a predetermined position of said rotatable member relative to said stationary member, and said means enabling said other section of said exciting winding to cause current flow through said other section of said main winding while keeping said one section of said exciting winding from causing current flow through said one section of said main winding during a different position of said rotatable member relative to said stationary member.

29. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, a field winding that generates a magnetic field, and the widths of said poles on said rotatable member bearing to the widths of said poles on said stationary member a ratio of at least two, whereby the volt-ampere output curve of said electric generator roughly approximates a constant voltage curve.

30. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, said stator encircling said rotor, said stator having more poles than said rotor, the widths of the poles on said rotor being greater than the widths of the poles on said stator.

31. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, said stator encircling said rotor, said stator having more poles than said rotor, the widths of the poles on said rotor being greater than the widths of the poles on said stator, and said poles of said rotor having sides that converge inwardly toward the center of said rotor.

32. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on a first group of poles of one of said members and which has another section thereof wound on a second group of poles of said one of said members, said first and said second groups of poles on said one of said members being dimensioned and spaced so all of the poles of said second group of poles of said one of said members are substantially out of register with poles of the other of said members when the poles of said first group of poles of said one of said members are substantially in register with poles of the other of said members and so all of the poles of said first group of poles of said one of said members are substantially out of register with poles of the other of said members when the poles of said second group of poles of said one of said members are substantially in register with poles of the other of said members, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member.

33. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on a first group of poles of one of said members and which has another section thereof wound on a second group of poles of said one of said members, said first and said second groups of poles on said one of said members being dimensioned and spaced so the reluctances of the poles of said first group are higher than the reluctances of the poles of said second group at one relative position of said rotatable and stationary members and so the reluctances of the poles of said first group are lower than the reluctances of the poles of said second group at another relative position of said rotatable and stationary members, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member.

34. An electric generator as claimed in claim 33 wherein the ratio of maximum to minimum inductance of each of said sections of said main winding is at least two.

35. An electric generator as claimed in claim 33 wherein the ratio of maximum to minimum inductance of each of said sections of said main winding is at least two, and wherein said poles on the other of said members are wider than the poles on said one member to provide a ratio of pole widths of at least one and one-half to one.

36. An electric generator which comprises a stationary member of magnetic material that has a plurality of circumferentially-spaced poles thereon, a rotatable member of magnetic material that has a plurality of circumferentially-spaced poles thereon, sad rotatable member being mounted adjacent to, and being rotatable relative to, said stationary member to provide relative movement between said poles on said members, a main winding which has one section thereof wound on at least some of the poles of one of said members and which has a further section thereof wound on at least one further pole of said one member, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, said poles on the other of said members being wider than the poles on said one member to provide a ratio of pole widths of at least one and one-half to one.

37. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least some of the poles of one of said members and which has a further section thereof wound on at least one further pole of said one member, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, a field winding which is wound on at least some of the poles of said one of said members, and the ampere turns of said field winding being fewer than the ampere turns of said main winding.

38. An electric generator as claimed in claim 37 wherein an exciting winding is wound on at least some of the poles of said one of said members, wherein the ampere turns of said field winding are fewer than the ampere turns of said main winding, and wherein the ampere turns of said exciting winding are fewer than the ampere turns of said main winding.

39. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, unidirectional means that permit current to flow in said one section and in said further section, respectively, of said main winding as the poles on which said sections are wound separate from the poles of the other member, said unidirectional means preventing current flow in said one section and in said other section, respectively, of said main winding as the poles on which said sections are wound approach the poles of said other member, and said poles on said one member being dimensioned and spaced relative to said poles on the other of said members to cause each section of said main winding to have a ratio of maximum to minimum inductance of at least two.

40. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, said being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, the poles on the other of said members being wider than said poles on said one member to provide a ratio of pole widths of at least one and one-half to one.

41. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, said poles on said one member being dimensioned and spaced relative to said pole on the other of said members to cause each section of said main winding to have a ratio of maximum to minimum inductance of at least two, and the poles on the other of said members being wider than said poles on said one member to provide a ratio of pole widths of at least one and one-half to one.

42. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which is wound on at least some of the poles of one of said members, a field winding that generates a magnetic field, an exciting winding that is adjacent said field winding and that is connected to said main winding, said exciting winding responding to said magnetic field generated by said field winding and to the rotation of said rotatable member relative to said stationary member to cause exciting current to flow in said main winding, said main winding responding to said exciting current from sad exciting winding and to said rotation of said rotatable member relative to said stationary member to develop an output current, said main winding being divided into a plurality of sections, a unidirectional means connected in series with at least one of said sections of said main winding to permit output current to flow in one direction through said one of said sections while preventing flow of output current in the opposite direction through said one of said sections, a further unidirectional means connected in series with another of said sections of said main winding to permit output current to flow in a given direction through said other of said sections while preventing flow of output current in the opposed direction through said other of said sections, said exciting winding having a plurality of sections, another unidirectional means connected in series with said one section of said main winding and with one section of said exciting winding to enable said one section of said exciting winding to cause unidirectional current flow through said one section of said main winding, yet another unidirectional means connected in series with said other section of said main winding and with another section of said exciting winding to cause unidirectional current flow through said other section of said main winding, and said one section of said main winding and said other section of said main winding being connected so said unidirectional current flow through said one section of said main winding, due to said one section of said exciting winding, also flows through said other section of said main winding and so said unidirectional current flow through said other section of said main winding, due to said other section of said exciting winding, also flows through said one section of said main winding.

43. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which is wound on at least some of the poles of one of said members, a field winding that generates a magnetic field, an exciting winding that is adjacent said field winding and that is connected to said main winding, said exciting winding responding to said magnetic field generated by said field winding and to the rotation of sad rotatable member relative to said stationary member to cause exciting current to flow in said main winding, said main winding responding to said exciting current from said exciting winding and to said rotation of said rotatable member relative to said stationary member to develop an output current, said main winding being divided into a plurality of sections, a unidirectional means connected in series with at least one of said sections of said main winding to permit output current to flow in one direction through said one of said sections while preventing flow of output current in the opposite direction through said one of said sections, a further unidirectional means connected in series with another of said sections of said main winding to permit output current to flow in a given direction through said other of said sections while preventing flow of output current in the opposed direction through said other of said sections, said exciting winding having a plurality of sections, another unidirectional means connected in series with said one section of said main winding and with one section of said exciting winding to enable said one section of said exciting winding to cause unidirectional current flow through said one section of said main winding, yet another unidirectional means connected in series with said other section of said main winding and with another section of said exciting winding to cause uni-directional current flow through said other section of said main winding, said one section of said main winding and said other section of said main winding being connected so said unidirectional current flow through said one section of said main winding, due to said one section of said exciting winding, also flows through said other section of said main winding and so said uni-directional current flow through said other section of said main winding, due to said other section of said exciting winding, also flows through said one section of said main winding, and the first said and said further unidirectional means permitting said output current flow in said one direction and said output current flow in said given direction to be A.C.

44. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said unidirectional means preventing current flow in said one section and in said other section, respectively, of said main winding as the poles on which said sections are wound approach the poles of said other member, said rotatable member having a predetermined number of poles thereon, said stationary member having a different number of poles thereon, and said number of poles on said rotatable member bearing to the number of poles on said stationary member the ratio of 2n:4n wherein said electric generator is a single phase generator and where n is a positive integer.

45. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said unidirectional means preventing current flow in said one section and in said other section, respectively, of said main winding as the poles on which said sections are wound approach the poles of said other member, said rotatable member having a predetermined number of poles thereon, said stationary member having a different number of poles thereon, and said number of poles on said rotatable member bearing to the number of poles on said stationary member the ration of 2n:2/3n where said electric generator is a single phase generator and where n is a positive integer.

46. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has one section thereof wound on at least one pole of one of said members and which has a further section thereof wound on at least one further pole of said one member, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, said poles on the other of said members being wider than the poles on said one member to provide a ratio of pole widths of at least three to one, whereby the output of said electric generator will have a high third harmonic content.

47. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which is divided into a plurality of sections, a unidirectional means connected in series with one of said sections of said main winding to permit output current to flow in one direction through said one section while preventing flow of output current in the opposite direction through said one section, and a further unidirectional means in series with another of said sections to permit output current to flow in a given direction through said other section while preventing flow of output current in the opposed direction through said other section, said sections of said main winding being connected to enable said sections to provide A.C. flow therein.

48. An electric generator which comprises a stationary member of magnetic material that has a plurality of circumferentially-spaced poles thereon, a rotatable member of magnetic material that has a plurality of circumferentially-spaced poles thereon, said rotatable member being mounted adjacent to, and being rotatable relative to, said stationary member to provide relative movement between said poles on said members, a main winding which has a plurality of sections, one of said sections of said main winding being wound on at least one pole of one of said members and a further section of said main winding being wound on at least one further pole of said one member, said main winding responding to rotation of said rotatable member relative to said stationary member to tend to cause current to flow in said one section and in said further section thereof, and uni-directional means that permit current to flow in said one section and in said further section, respectively, of said main winding as the poles on which said sections are wound separate from the poles of the other member, said uni-directional means preventing current flow in said one section and in said other section, respectively, of said main winding as the poles on which said sections are wound approach the poles of said other member, a predetermined one of the sections of said main winding developing at least one north pole and at least one south pole, another of said sections of said main winding developing at least one north and at least one south pole, each north pole of said main winding being interposed between a south pole and another north pole, and each south pole of said main winding being interposed between a north pole and another south pole.

49. An electric generator as claimed in claim 48 wherein a field winding develops at least one north pole and at least one south pole, wherein no north pole developed by said main winding opposes a north pole developed by said field winding, and wherein no south pole developed by said main winding opposes a south pole developed by said field winding.

* * * * *